United States Patent
Ki et al.

(10) Patent No.: US 11,260,727 B2
(45) Date of Patent: Mar. 1, 2022

(54) VEHICLE, REFRIGERATOR FOR VEHICLE, AND CONTROLLING METHOD FOR REFRIGERATOR FOR VEHICLE

(71) Applicant: LG ELECTRONICS INC., Seoul (KR)

(72) Inventors: Duchan Ki, Seoul (KR); Chanho Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/635,793

(22) PCT Filed: Jul. 31, 2018

(86) PCT No.: PCT/KR2018/008698
§ 371 (c)(1),
(2) Date: Jan. 31, 2020

(87) PCT Pub. No.: WO2019/027235
PCT Pub. Date: Feb. 7, 2019

(65) Prior Publication Data
US 2020/0269658 A1    Aug. 27, 2020

(30) Foreign Application Priority Data

Aug. 1, 2017    (KR) .................. 10-2017-0097842

(51) Int. Cl.
*B60H 1/00*        (2006.01)
*B60H 1/32*        (2006.01)
*F25D 29/00*       (2006.01)

(52) U.S. Cl.
CPC ........... *B60H 1/3205* (2013.01); *F25D 29/00* (2013.01); *F25B 2600/01* (2013.01);
(Continued)

(58) Field of Classification Search
CPC .................... B60H 1/3205; F25D 2400/28
See application file for complete search history.

(56) References Cited

U.S. PATENT DOCUMENTS

| 1,420,711 A | 6/1922 | Knutson |
| 1,814,114 A | 7/1931 | Bodman |

(Continued)

FOREIGN PATENT DOCUMENTS

| CN | 2066123 | 11/1990 |
| CN | 1056276 | 11/1991 |

(Continued)

OTHER PUBLICATIONS

Chinese Office Action dated Dec. 9, 2020 issued in Application No. 201880050202.3.

(Continued)

*Primary Examiner* — Jonathan Bradford
(74) *Attorney, Agent, or Firm* — Ked & Associates LLP

(57) ABSTRACT

A vehicle, a refrigerator for a vehicle, and a method for controlling a refrigerator for a vehicle are provided. The method for controlling the refrigerator for the vehicle includes turning on a switch of the refrigerator for the vehicle, measuring a temperature of an interior of the refrigerator for the vehicle a first time, measuring a temperature of the interior of the refrigerator for the vehicle again a second time after a predetermined time has elapsed from the first time, determining a temperature change of the interior of the refrigerator from the first time to the second time, and operating the refrigerator for the vehicle in a quench mode in which the temperature in the interior of the refrigerator is rapidly lowered, unlike a normal mode, if the temperature change in the interior of the refrigerator is in a positive direction.

19 Claims, 17 Drawing Sheets

(52) U.S. Cl.
CPC .... *F25B 2600/024* (2013.01); *F25D 2400/28* (2013.01); *F25D 2700/12* (2013.01)

(56) References Cited

U.S. PATENT DOCUMENTS

| | | | |
|---|---|---|---|
| 1,845,353 | A | 2/1932 | Snell |
| 2,000,882 | A | 5/1935 | Comstock |
| 2,065,608 | A | 12/1936 | Munters |
| 2,464,526 | A | 3/1949 | Palmer |
| 2,989,156 | A | 6/1961 | Brooks et al. |
| 3,156,975 | A | 11/1964 | Shaw |
| 3,161,265 | A | 12/1964 | Matsch et al. |
| 3,338,451 | A | 8/1967 | Kesling |
| 3,936,553 | A | 2/1976 | Rowe |
| 4,545,211 | A | 10/1985 | Gaus |
| 4,545,213 | A | 10/1985 | Fujiwara et al. |
| 4,705,099 | A | 11/1987 | Taniguchi et al. |
| 4,826,040 | A | 5/1989 | Jahr, Jr. et al. |
| 4,837,388 | A | 6/1989 | Kugelmann |
| 5,011,729 | A | 4/1991 | McAllister |
| 5,157,893 | A | 10/1992 | Benson et al. |
| 5,500,305 | A * | 3/1996 | Bridges .................. E04B 1/803 428/621 |
| 5,720,536 | A | 2/1998 | Jenkins et al. |
| 5,860,594 | A | 1/1999 | Reason et al. |
| 6,769,265 | B1 * | 8/2004 | Davis .................. F25D 17/065 62/187 |
| 7,571,582 | B2 | 8/2009 | Hirai et al. |
| 7,891,203 | B1 | 2/2011 | Burns et al. |
| 8,752,921 | B2 | 6/2014 | Görz et al. |
| 8,765,247 | B2 | 7/2014 | Park |
| 8,822,006 | B2 | 9/2014 | Yoon et al. |
| 9,170,046 | B2 | 10/2015 | Jung |
| 10,274,247 | B2 | 4/2019 | Jeong et al. |
| 10,337,788 | B2 | 7/2019 | Jung et al. |
| 10,543,560 | B2 | 1/2020 | Nakakura et al. |
| 10,639,743 | B2 | 5/2020 | Azuma et al. |
| 10,753,669 | B2 | 8/2020 | Dherde et al. |
| 10,760,849 | B2 | 9/2020 | Jung et al. |
| 10,837,696 | B2 | 11/2020 | Jung et al. |
| 10,899,264 | B2 | 1/2021 | Jung et al. |
| 10,907,887 | B2 | 2/2021 | Jung et al. |
| 10,913,232 | B2 | 2/2021 | Dye et al. |
| 10,941,974 | B2 | 3/2021 | Jung et al. |
| 11,047,616 | B2 | 6/2021 | Jeong et al. |
| 2002/0041134 | A1 | 4/2002 | Wolf et al. |
| 2004/0226956 | A1 | 11/2004 | Brooks |
| 2010/0071384 | A1 * | 3/2010 | Lu ............................ F25B 7/00 62/3.2 |
| 2010/0251653 | A1 | 10/2010 | Mills |
| 2010/0252698 | A1 | 10/2010 | Dye et al. |
| 2011/0204065 | A1 | 8/2011 | Kolowich |
| 2012/0104923 | A1 | 5/2012 | Jung et al. |
| 2012/0128920 | A1 | 5/2012 | Yoon et al. |
| 2013/0105494 | A1 | 5/2013 | Jung |
| 2013/0105495 | A1 | 5/2013 | Jung |
| 2013/0111942 | A1 | 5/2013 | Jung |
| 2013/0200084 | A1 | 8/2013 | Jung et al. |
| 2015/0044412 | A1 | 2/2015 | Miyaji et al. |
| 2016/0109172 | A1 | 4/2016 | Kim et al. |
| 2016/0258671 | A1 | 9/2016 | Allard et al. |
| 2018/0216872 | A1 | 8/2018 | Jung et al. |
| 2018/0216873 | A1 | 8/2018 | Jung et al. |
| 2018/0224052 | A1 | 8/2018 | Jung et al. |
| 2018/0224193 | A1 | 8/2018 | Jung et al. |
| 2018/0224194 | A1 | 8/2018 | Jung et al. |
| 2018/0224195 | A1 | 8/2018 | Jung et al. |
| 2018/0224196 | A1 | 8/2018 | Jung et al. |
| 2018/0224197 | A1 | 8/2018 | Jung et al. |
| 2018/0224198 | A1 | 8/2018 | Jung et al. |
| 2018/0231298 | A1 | 8/2018 | Jung et al. |
| 2018/0231300 | A1 | 8/2018 | Jung et al. |
| 2018/0238486 | A1 | 8/2018 | Jung et al. |
| 2018/0238610 | A1 | 8/2018 | Jung et al. |
| 2018/0356147 | A1 | 12/2018 | Jung et al. |
| 2019/0255980 | A1 | 8/2019 | Jung et al. |
| 2020/0182393 | A1 | 6/2020 | Jung et al. |
| 2021/0140704 | A1 | 5/2021 | Kim et al. |

FOREIGN PATENT DOCUMENTS

| | | |
|---|---|---|
| CN | 2691933 | 4/2005 |
| CN | 2720362 | 8/2005 |
| CN | 102455105 | 5/2012 |
| CN | 103090616 | 5/2013 |
| CN | 104204646 | 12/2014 |
| CN | 104296490 | 1/2015 |
| CN | 104457117 | 3/2015 |
| CN | 104482707 | 4/2015 |
| CN | 104833157 | 8/2015 |
| CN | 104913571 | 9/2015 |
| CN | 106016957 | 10/2016 |
| CN | 205784134 | 12/2016 |
| CN | 106766594 | 5/2017 |
| DE | 10 2011 050472 | 11/2011 |
| EP | 1 564 513 | 8/2005 |
| EP | 2462372 | 10/2016 |
| GB | 890372 | 2/1962 |
| JP | S 60-179344 | 9/1985 |
| JP | 01-142379 | 6/1989 |
| JP | 01-179882 | 7/1989 |
| JP | H05-9298 | 2/1993 |
| JP | 2002-071088 | 3/2002 |
| JP | 2003-042388 | 2/2003 |
| JP | 2004-211376 | 7/2004 |
| JP | 2006-082604 | 3/2006 |
| JP | 2012-021615 | 2/2012 |
| JP | 2012-207682 | 10/2012 |
| JP | 2013-007439 | 1/2013 |
| JP | 2013-189996 | 9/2013 |
| JP | 5316672 | 10/2013 |
| KR | 10-2001-0073363 | 8/2001 |
| KR | 10-0343719 | 7/2002 |
| KR | 10-0363646 | 11/2002 |
| KR | 20-0303619 | 2/2003 |
| KR | 10-2004-0042682 | 5/2004 |
| KR | 10-2007-0037274 | 4/2007 |
| KR | 10-0845153 | 7/2008 |
| KR | 10-2010-0109653 | 10/2010 |
| KR | 10-2011-0015327 | 2/2011 |
| KR | 10-2011-0113414 | 11/2011 |
| KR | 10-2012-0139648 | 12/2012 |
| KR | 10-2013-0084561 | 7/2013 |
| KR | 10-2015-0012712 | 2/2015 |
| KR | 10-2015-0109727 | 8/2015 |
| KR | 10-2017-0016190 | 2/2017 |
| KR | 10-2017-0016244 | 2/2017 |
| KR | 10-2018-0095281 | 8/2018 |
| RU | 2073285 | 2/1997 |
| RU | 2252377 | 5/2005 |
| RU | 2496063 | 10/2013 |
| RU | 2553251 | 6/2015 |
| RU | 2608791 | 1/2017 |
| WO | WO 91/19867 | 12/1991 |
| WO | WO 01/04553 | 1/2001 |
| WO | WO 2012/176880 | 12/2012 |
| WO | WO 2016/105019 | 6/2016 |
| WO | WO 2017/023072 | 2/2017 |
| WO | WO 2017/023073 | 2/2017 |
| WO | WO 2017/023075 | 2/2017 |
| WO | WO 2017/023076 | 2/2017 |
| WO | WO 2017/023077 | 2/2017 |
| WO | WO 2017/023087 | 2/2017 |
| WO | WO 2017/023088 | 2/2017 |
| WO | WO 2017/023089 | 2/2017 |
| WO | WO 2017/023090 | 2/2017 |
| WO | WO 2017/023094 | 2/2017 |
| WO | WO 2017/023095 | 2/2017 |
| WO | WO 2017/023097 | 2/2017 |
| WO | WO 2017/023100 | 2/2017 |

(56) References Cited

FOREIGN PATENT DOCUMENTS

WO    WO 2017/023102     2/2017
WO    WO 2017/105030     6/2017

OTHER PUBLICATIONS

Chinese Office Action dated Dec. 2, 2020 issued in Application No. 201880050497.4.
Russian Office Action dated Jun. 22, 2020 issued in RU Application No. 2020108484.
Chinese Office Action dated Dec. 9, 2020 issued in CN Application No. 201880053044.7.
Russian Office Action dated Sep. 18, 2020 issued in Application No. 2020110370/12.
International Search Report and Written Opinion dated Nov. 29, 2018 issued in Application No. PCT/KR2018/008698.
International Search Report and Written Opinion dated Nov. 8, 2018 issued in Application No. PCT/KR2018/008687.
International Search Report and Written Opinion dated Nov. 21, 2018 issued in Application No. PCT/KR2018/008691.
International Search Report and Written Opinion dated Nov. 23, 2018 issued in Application No. PCT/KR2018/008689.
International Search Report and Written Opinion dated Nov. 23, 2018 issued in Application No. PCT/KR2018/008694.
Chinese Office Action dated Feb. 1, 2021 issued in CN Application No. 201880050501.7.
European Search Report issued in Application No. 18840899.1 dated Apr. 7, 2021.
Australian Examination Report dated Feb. 17, 2021 issued in Application No. 2018309544.
European Search Report dated Mar. 24, 2021 issued in Application No. 18846385.5.
European Search Report dated Mar. 24, 2021 issued in Application No. 18840407.3.
U.S. Office Action dated Jul. 7, 2021 issued in U.S. Appl. No. 16/635,729.
European Search Report issued in Application No. 18840183.0 dated Mar. 29, 2021.
Australian Office Action dated Mar. 9, 2021 issued in AU Application No. 2018309541.
European Search Report dated Mar. 30, 2021 issued in EP Application No. 18840503.9.
Russian Office Action dated Feb. 20, 2021.
Australian Office Action dated Feb. 11, 2021 issued in AU Application No. 2018309538.
European Search Report dated Mar. 24, 2021 issued in EP Application No. 18842051.7.
U.S. Appl. No. 16/635,699, filed Jan. 31, 2020.
U.S. Appl. No. 16/635,729, filed Jan. 31, 2020.
U.S. Appl. No. 16/635,758, filed Jan. 31, 2020.
U.S. Appl. No. 16/635,776, filed Jan. 31, 2020.
U.S. Appl. No. 16/635,793, filed Jan. 31, 2020.
U.S. Appl. No. 16/637,861, filed Feb. 10, 2020.
United States Office Action dated Sep. 27, 2021 issued in co-pending related U.S. Appl. No. 16/637,861.
United States Office Action dated Oct. 29, 2021 issued in co-pending related U.S. Appl. No. 16/635,776.
Chinese Office Action dated Sep. 3, 2021 issued in CN Application No. 201880050572.7.
Chinese Office Action dated Sep. 28, 2021 issued in CN Application No. 201880050571.2.

* cited by examiner

VEHICLE, REFRIGERATOR FOR VEHICLE, AND CONTROLLING METHOD FOR REFRIGERATOR FOR VEHICLE

This application is a U.S. National Stage Application under 35 U.S.C. § 371 of PCT Application No. PCT/KR2018/008698, filed Jul. 31, 2018, which claims priority to Korean Patent Application No. 10-2017-0097842, filed Aug. 1, 2017, whose entire disclosures are hereby incorporated by reference.

BACKGROUND

Field

A vehicle, a refrigerator for a vehicle, and a method for controlling a refrigerator for a vehicle are disclosed herein.

Background

A refrigerator is an apparatus for storing products, such as foods, received in the refrigerator at a low temperature including sub-zero temperatures. As a result of this action, there is an advantage that a user's intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after fixedly mounted on the vehicle, has been increasing in demand. The refrigerator for the vehicle is increasingly in demand due to an increase in supply of vehicles and an increase in premium-class vehicle.

A conventional configuration of the refrigerator for the vehicle will be described hereinafter. For a first example, there is an example in which heat in the refrigerator is forcibly discharged outside of the refrigerator using a thermoelement. However, there is a limitation in that a cooling rate is slow due to low thermal efficiency of the thermoelement deteriorating user satisfaction.

For another example, there is an example in which a refrigerant or cold air is drawn from an air conditioning system installed for air-conditioning an entire interior of the vehicle and used as a cooling source for the refrigerator for the vehicle. In this example, there is a disadvantage that a separate flow path of air or refrigerant is required to draw the air or refrigerator from the air conditioning system of the vehicle. Also, there is a limitation that low-temperature energy is lost during movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied. However, in this example, as a component constituting the refrigeration cycle is large in size, most of the component is mounted in a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo capable of being loaded in the trunk.

U.S. Pat. No. 4,545,211 is a representative example of the above-mentioned example. The technology of the cited document has the following limitations.

There is a limitation that an internal volume of the vehicle refrigerator is reduced due to a large volume of a machine room. There is a limitation that the driver may not use the vehicle refrigerator without stopping driving when the driver is alone in the vehicle because the refrigerator is installed in the back seat. Also, as the door is opened forward, there is inconvenience that it may not put an object in the front. Since the cooling in the refrigerator is performed by direct cooling, that is, by natural convection, it takes a long time to cool a product. As the machine room is directly opened to the outside, there is a high possibility that foreign substances are mixed into the inside of the machine room causing a failure. There is a limitation that the suctioned air is mixed again because suction and exhaust of the air are not separated from each other, deteriorating heat efficiency. There is a limitation that inconvenience is caused to the user due to noise of the machine room according to use of the compressor.

Due to such a limitation, the present applicant has proposed a refrigerator for a vehicle having a separate refrigerant compressor in the driver's seat. The vehicle refrigerator is affected by the environment in which the vehicle is placed. Further, as the vehicle is placed in an external environment, the vehicle refrigerator experiences extreme temperature changes. For example, it may be exposed to a temperature of 80° C. in summer, and may reach −30° C. in winter.

The vehicle refrigerator may be used by the driver additionally while the vehicle is in operation. According to such use, it is necessary that a desired temperature environment is urgently needed in a state of not being used for a long time.

The refrigerator for the vehicle is a device for accompanying vehicle operation and does not have a separate temperature adjustment button. In other words, only the power switch of the vehicle refrigerator is controlled to control the operation of the refrigerator.

An object of embodiments is to provide a refrigerator for a vehicle which enables a user to quickly eat food in a desired state even if the refrigerator for a vehicle is directly affected by the external environment. An object of embodiments is to provide a refrigerator for a vehicle which is cable of being stored in an optimal state of food only by an on-off operation. An object of embodiments is to provide a refrigerator for a vehicle that reflects the state of a stored article housed in a refrigerator for a vehicle.

In order to quickly realize a desired state of food by reflecting the state of the food, an interior of a refrigerator for a vehicle is measured twice, and if a temperature change in the interior of the refrigerator is positive, the refrigerator for the vehicle is operated in a quenching mode. In order to reflect both a vehicle state and a food state, a vehicle refrigerator is operated in a quench mode when a temperature measured first is higher than a reference temperature and a temperature change in the interior of the refrigerator is negative. In order to allow food to be stored in an optimal state only by an on-off operation, when reaching a predetermined target temperature during an operation of a quench mode, the operation mode is automatically shifted to the normal mode in which it is cooled slowly.

According to embodiments, it is possible to implement an optimum operating condition of the refrigerator for a vehicle by reflecting the state of the vehicle. According to embodiments, it is possible to optimally implement a refrigeration state automatically only by operating the refrigerator button in the vehicle. According to embodiments, an initial state of the refrigerator and an initial state of a stored article may be reflected together, so that the refrigerator operates under optimal conditions.

The details of one or more embodiments are set forth in the accompanying drawings and the description below. Other features will be apparent from the description and drawings, and from the claims.

BRIEF DESCRIPTION OF THE DRAWINGS

FIGS. 16A-16C are views of a conductive resistance sheet and a peripheral portion of the conductive resistance sheet;

DETAILED DESCRIPTION OF THE DRAWINGS

Figure 1:
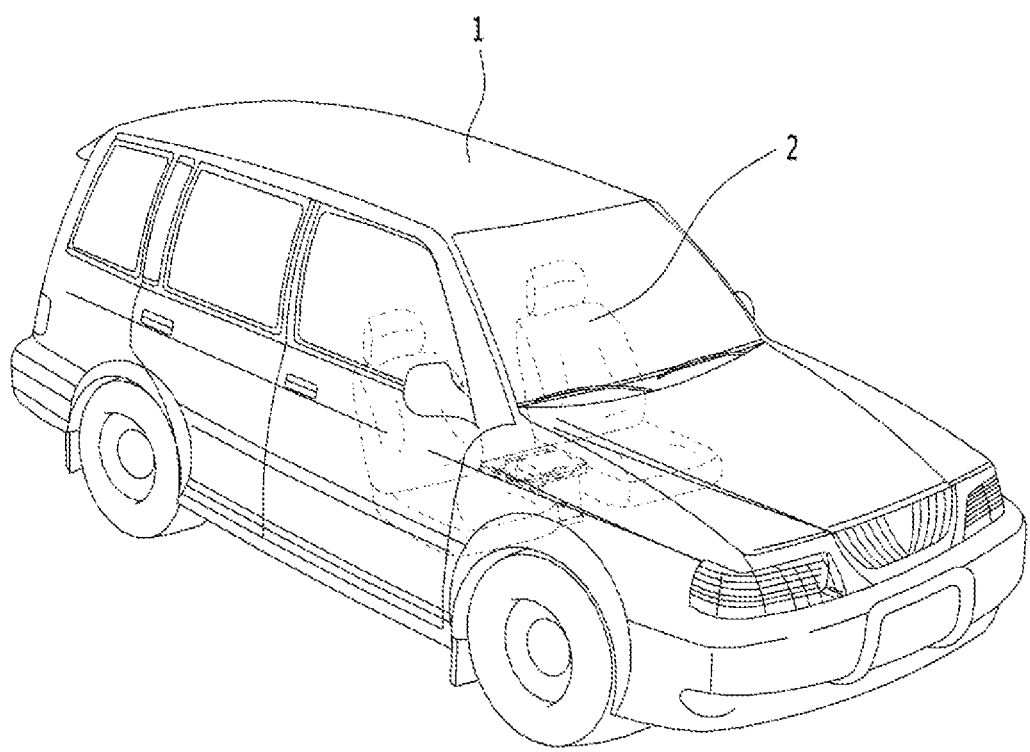
FIG. 1 is a perspective view of a vehicle according to an embodiment.

In the following description of embodiments with reference to the drawings, the same reference numerals are given to different drawings in the case of the same components. Also, in the description of each drawing, the description will be made with reference to a direction in which the vehicle is viewed from a front of the vehicle, rather than the front viewed by a driver based on a traveling direction of the vehicle. For example, the driver is on the right, and the assistant driver is on the left.

FIG. 1 is a perspective view of a vehicle according to an embodiment. Referring to FIG. 1, a seat 2 on which a user is seated is provided in a vehicle 1. The seat 2 may be provided in a pair horizontally spaced apart from each other. A console is disposed between the seats 2, and a driver places items that are necessary for driving or components that are necessary for manipulating the vehicle on the console. Front seats in which the driver and the assistant driver are seated may be described as an example of the seats 2. It should be understood that the vehicle includes various components, which are necessary for driving the vehicle, such as a moving device, such as a wheel, a driving device, such as an engine, and a steering device, such as a steering wheel.

The refrigerator for the vehicle according to an embodiment may be placed on the console. However, embodiments are not limited thereto. For example, the refrigerator for the vehicle may be installed in various spaces. For example, the refrigerator for the vehicle may be installed in a space between rear seats, a door, a globe box, and a center fascia. This is one of factors that the refrigerator for the vehicle according to an embodiment is capable of being installed only when power is supplied, and a minimum space is secured. However, it is a great advantage of the embodiment in that it may be installed in the console between the seats, which is limited in space due to limitations in vehicle design.

Figure 2:
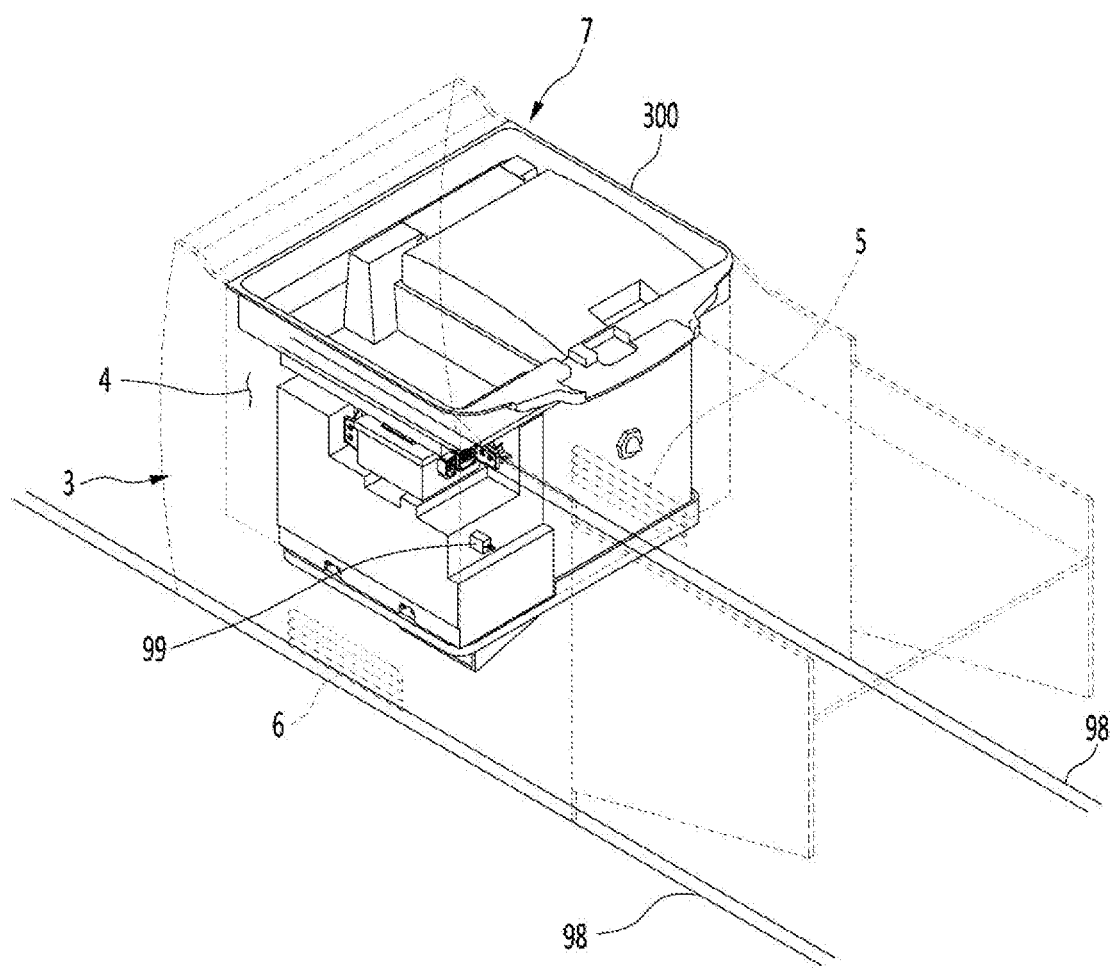
FIG. 2 is an enlarged perspective view illustrating a console of the vehicle.

FIG. 2 is an enlarged perspective view illustrating the console of the vehicle. Referring to FIG. 2, a console 3 may be provided as a separate part made of a material, such as a resin. A steel frame 98 may be provided below the console 3 to maintain a strength of the vehicle, and a sensor part (sensor) 99, such as a sensor, may be disposed in a space part (space) between the console 3 and the steel frame 98. The sensor part 99 may be a part that is necessary for accurately sensing an external signal and measuring a signal at a position of the driver. For example, an airbag sensor that is directly connected to a life of the driver may be mounted.

The console 3 may have a console space 4 therein, and the console space 4 may be covered by a console cover 300. The console cover 300 may be installed to the console 3 in a fixed type. Thus, it is difficult for external foreign substances to be introduced into the console through the console cover 300. A vehicle refrigerator 7 is seated in the console space 4.

A suction port 5 may be provided in a right (first) surface of the console 3 to introduce air within the vehicle into the console space 4. The suction port 5 may face the driver. An exhaust port 6 may be provided in a left (second) surface of the console 3 to exhaust warmed air while the vehicle refrigerator operates from inside of the console space 4. The exhaust port 6 may face the assistant driver. A grill may be provided in each of the suction port 5 and the exhaust port 6 to prevent a user's hand from being inserted and thereby to provide safety, prevent an object, which falls from an upper side, from being introduced, and allow air to be exhausted to flow downward so as not to be directed to the person.

Figure 3:
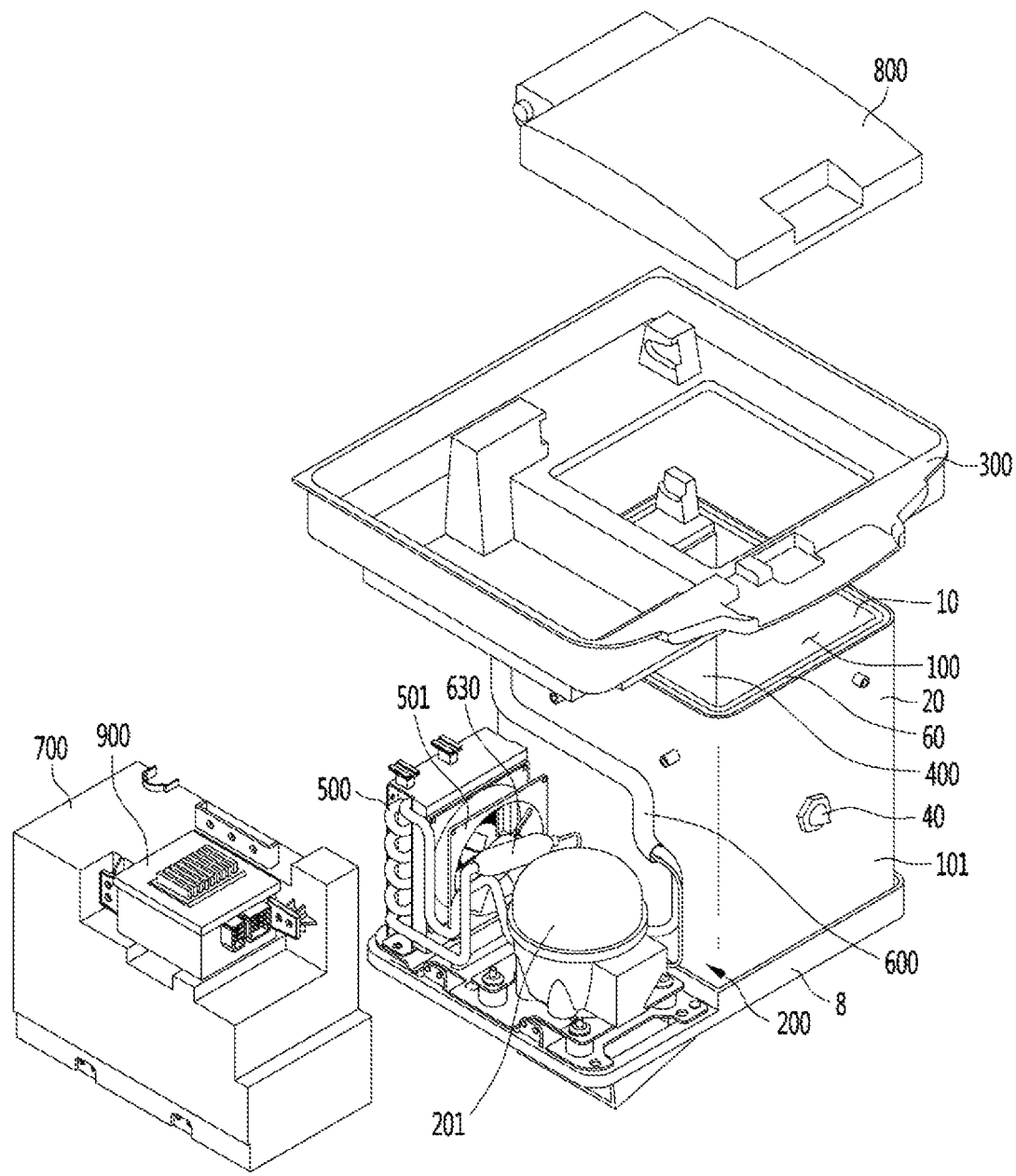
FIG. 3 is a schematic perspective view illustrating an inside of a vehicle refrigerator.

FIG. 3 is a schematic perspective view illustrating an inside of a vehicle refrigerator. Referring to FIG. 3, the vehicle refrigerator 7 includes a refrigerator bottom frame 8 that supports parts (components), a machine room 200 provided in a left (first) side of the refrigerator bottom frame 8, and a cavity 100 provided in a right (second) side of the refrigerator bottom frame 8. The machine room 200 may be covered by a machine room cover 700, and an upper side of the cavity 100 may be covered by the console cover 300 and a door 800. The machine room cover 700 may not only guide a passage of cooling air, but also prevent foreign substances from being introduced into the machine room 200.

A controller 900 may be disposed on the machine room cover 700 to control an overall operation of the vehicle refrigerator 7. As the controller 900 is installed at the above-described position, the vehicle refrigerator 7 may be controlled to operate without problems in a proper temperature range in a narrow space inside of the console space 4.

That is, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an open upper portion of the console space 4, but also cover an upper edge of the cavity 100. The door 800 may be installed on the console cover 300 to allow the user to open and close an opening through which products are dispensed to the cavity 100. The door 800 may be opened using rear portions of the console cover 300 and the cavity 100 as hinge points. The opening of the console cover 300, the door 800, and the cavity 100 may be performed by easily manipulating the door 800 by the user because the console cover 300, the door 800, and the cavity 100 are horizontally disposed when viewed from the user and also disposed at a rear side of the console.

A condensation module 500, a dryer 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are introduced into the cavity 100.

The cavity 100 has an open top surface and five surfaces that are covered by a vacuum adiabatic body 101. The cavity 100 may be thermally insulated by an individual vacuum adiabatic body or one or more vacuum adiabatic bodies communicating with each other. The cavity 100 may be provided by the vacuum adiabatic body 101. Also, the cavity 100 through which the products are accessible through one surface opened by the vacuum adiabatic body 101 may be provided.

The vacuum adiabatic body 101 may include a first plate member (first plate) 10 providing a boundary of a low-temperature inner space of the cavity 100, a second plate member (second plate) 20 providing a boundary of a high-temperature outer space, and a conductive resistance sheet 60 blocking heat transfer between the plate members 10 and 20. As the vacuum adiabatic body 101 has a thin adiabatic thickness to maximally obtain adiabatic efficiency, the cavity 100 having a large capacity may be realized.

An exhaust and getter port for the exhaust of the inner space of the vacuum adiabatic body 101 and for installing a getter that maintains the vacuum state may be provided on one surface. The exhaust and getter port 40 may provide the exhaust and getter together to contribute to miniaturization of the vehicle refrigerator 7.

An evaporation module 400 may be installed in the cavity 100. The evaporation module 400 may evaporate the refrigerant introduced into the cavity 100 through the refrigerant conduit 600 and forcibly blow cold into the cavity 100.

The evaporation module 400 may be disposed at a rear side within the cavity 100. Thus, the front space within the cavity 100, which is used by the user facing a front side, may be increased to be even larger.

Figure 4:
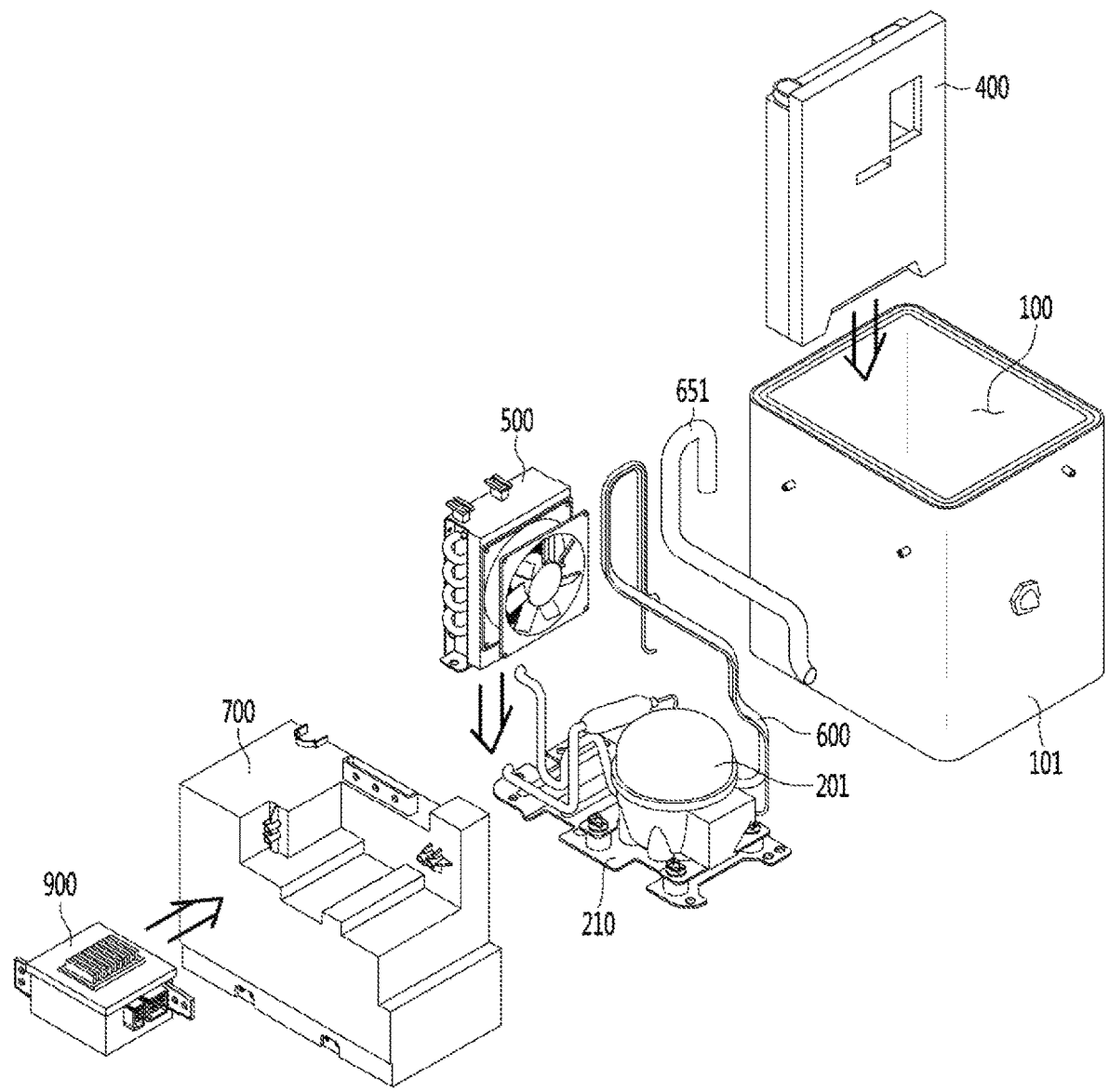
FIG. 4 is a view illustrating a connection relationship between a machine room and a cavity.

FIG. 4 is a view illustrating a connection relationship between a machine room and a cavity. Referring to FIG. 4, the evaporation module 400 is accommodated in the cavity 100. That is, the evaporation module 400 is disposed in the inner space of the cavity 100 having the vacuum adiabatic body 101 as an outer wall. Thus, the machine room 200 may be improved in space efficiency, and the cavity 100 may increase in inner space. This is because the vacuum adiabatic body achieves high adiabatic performance even though the vacuum adiabatic body has a thin thickness.

The refrigerant conduit 600 guides the refrigerant into the evaporation module 400 over a top surface of the cavity 100. It may be considered that the refrigerant conduit 600 passes through the vacuum adiabatic body 101 to reduce a volume thereof. However, as the vehicle has a lot of vibration, and the inside of the vacuum adiabatic body 101 is maintained in considerably high vacuum state, sealing of the contact portion between the refrigerant conduit 600 and the vacuum adiabatic body 101 may be damaged. Thus, it is not advantageous for the refrigerant conduit 600 passes through the vacuum adiabatic body 101. For example, air leakage due to vibration of the vehicle may occur. If air leaks from the vacuum adiabatic body, it may be expected that the adiabatic effect is significantly deteriorated.

The evaporation module 400 may be installed to contact a hinge point of the door within the cavity 100, i.e., a rear surface within the cavity 100. This is because a path that is necessary for allow the refrigerant conduit 600 to extend up to the evaporation module 400 is as short as possible for ensuring the internal volume of the cavity 100. Also, the inner volume of the cavity may be maximized.

It is more advantageous that the refrigerant conduit 600 passing over the vacuum adiabatic body 101 passes through the hinge point of the door. If the evaporation module 400 is out of the hinge point of the door, a capacity of the cavity and low-temperature energy may be lost due to extension of the refrigerant conduit 600 and insulation of the refrigerant conduit 600.

The condensation module 500 may be coupled by a rear coupling unit of the machine room bottom frame 210. Air suctioned through the condensation module 500 may cool the compressor 201 and then be discharged downward from the compressor 201.

The machine room cover 700 may be coupled to a left (first) side of the cavity 100 to cover the machine room 200. Air flow for cooling may occur an upper side of the machine room cover 700, and the controller 900 may be provided in the cooling passage to perform sufficient cooling action.

Figure 5:
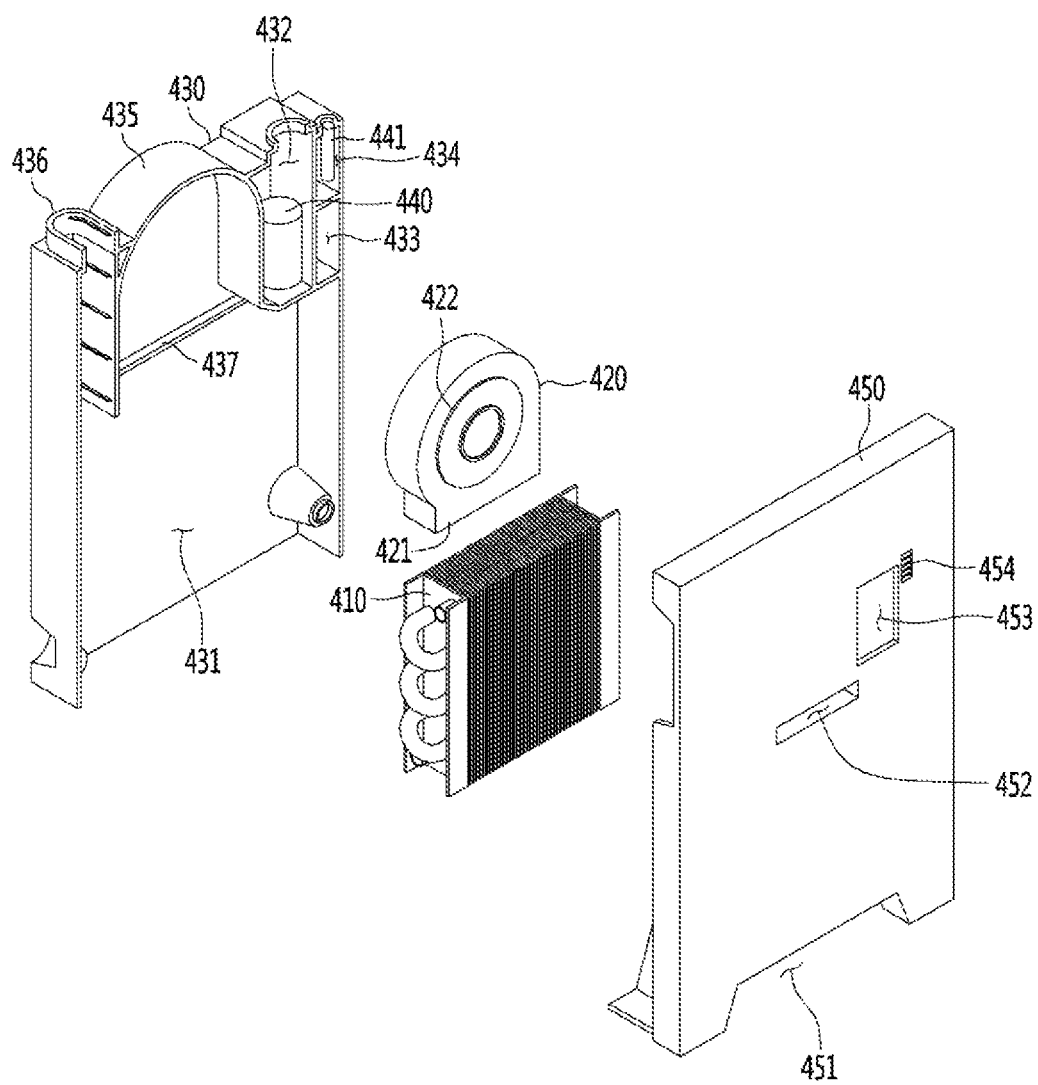
FIG. 5 is an exploded perspective view of an evaporation module.

FIG. 5 is an exploded perspective view of an evaporation module. Referring to FIG. 5, the evaporation module 400 includes a rear cover 430 disposed at a rear side to accommodate the parts and a front cover 450 disposed at a front side of the rear cover 430 to face the cavity 100. A space may be provided inside by the front cover 450 and the rear cover 430 to accommodate the parts in the space.

In the space defined by the front cover 450 and the rear cover 430, an evaporator 410 is disposed at a lower side, and an evaporation fan 420 is disposed at an upper side. A centrifugal fan capable of being mounted in a narrow space may be used as the evaporation fan 420. More particularly, a sirocco fan including a fan inlet 422 having a large area to suction air and a fan outlet 421 that blows air at a high speed in a predetermined discharge direction in a narrow space may be used as the evaporation fan 420. As the sirocco fan may be driven with low noise, it is also possible to use the sirocco fan in a low noise environment.

The air passing through the evaporator 410 is suctioned into the fan inlet 422, and the air discharged from the fan outlet 421 is discharged to the cavity 100. For this, a predetermined space may be provided between the evaporation fan 420 and the rear cover 430.

A plurality of compartments may be provided in the rear cover 430 to accommodate the parts. Particularly, the evaporator 410 and the evaporation fan 420 are disposed in a first compartment 431 to guide a flow of cold air. A lamp 440 may be disposed in a second compartment 432 to brighten the inside of the cavity 100 so that the user looks inside of the cavity 100. A temperature sensor 441 is disposed in a fourth compartment 434 to measure an inner temperature of the cavity 100 and thereby to control a temperature of the vehicle refrigerator.

When the temperature sensor 441 disposed in the fourth compartment 434 measures the inner temperature of the cavity 100, the flow in the cavity may not be affected. That is, the cold air of the evaporator 410 may not have a direct influence on a third compartment 433. Although the third compartment 433 is removed in some cases, the third compartment 433 may be provided to prevent an error of the inner temperature of the cavity 100 from occurring by conductive heat.

The fourth compartment 434 and the temperature sensor 441 are disposed at a left upper end, i.e., a vertex of the evaporation module 400, which is farthest from the evaporator 410. This is to prevent cold air from having an influence on the evaporator 410. That is, to prevent the cold air of the evaporator 410 from having a direct influence on the fourth compartment 434 through conduction, the fourth compartment 434 and the temperature sensor 441 may be isolated from the first compartment 431 by other compartments 432 and 433.

An inner structure of the first compartment 431 will be described in detail. A fan housing 435 is provided in a circular shape so that the evaporation fan 420 is disposed at an upper side of the first compartment 431, and an evaporator placing part 437 on which the evaporator 410 is placed is provided at a lower side. A conduit passage 436 is provided in a left (first) side of the fan housing 435.

The conduit passage 436 may be a portion through which refrigerant conduit 600 passing over the vacuum adiabatic body 101 is guided into the evaporation module 400 and be provided in a left (first) corner portion of the evaporation module. The refrigerant conduit 600 may include two conduits surrounded by the adiabatic material so that the two conduits through which the evaporation module 400 is inserted and withdrawn are heat-exchanged with each other. Thus, the conduit passage 436 may have a predetermined volume. The conduit passage 436 may vertically extend from a left (first) side of the evaporation module 400 to improve space density inside of the evaporation module 400.

As described above, the evaporator 410 and the evaporation fan 420 are provided in the rear cover 430 to perform cooling of air within the cavity and circulation of air within the cavity. The front cover 450 has an approximately rectangular shape like the rear cover 430. A cold air inflow hole 451 guiding air toward a lower side of the evaporator 410 and a cold air discharge hole 452 aligned with the fan outlet 421 are provided below the front cover 450. The cold air discharge hole 452 may have a shape an inner surface of which is smoothly bent forward to discharge air, which is discharged downward from the evaporation fan 420, forward. The front cover 450 aligned with the second compartment 432 may be opened, or a window 453 may be provided on the portion of the front cover 450 so that light of the lamp 440 is irradiated into the cavity 100.

An air vent hole 454 is defined in the front cover 450 aligned with the fourth compartment 434. The air discharged from the cold air discharge hole 452 circulates inside of the cavity 100 and then is introduced into the air vent hole 454. Thus, the inner temperature of the cavity 100 may be more accurately detected. For example, the inner temperature of the cavity 100 may be erroneously measured by a large amount of cold air discharged from the cold air discharge hole 452. The cold air may cause a static temperature inside of the cavity to have a direct influence without affecting the cold air blown from the evaporation fan 420. For this, the fourth compartment 434 may be disposed at the uppermost right end of the rear surface of the cavity.

Figure 6:
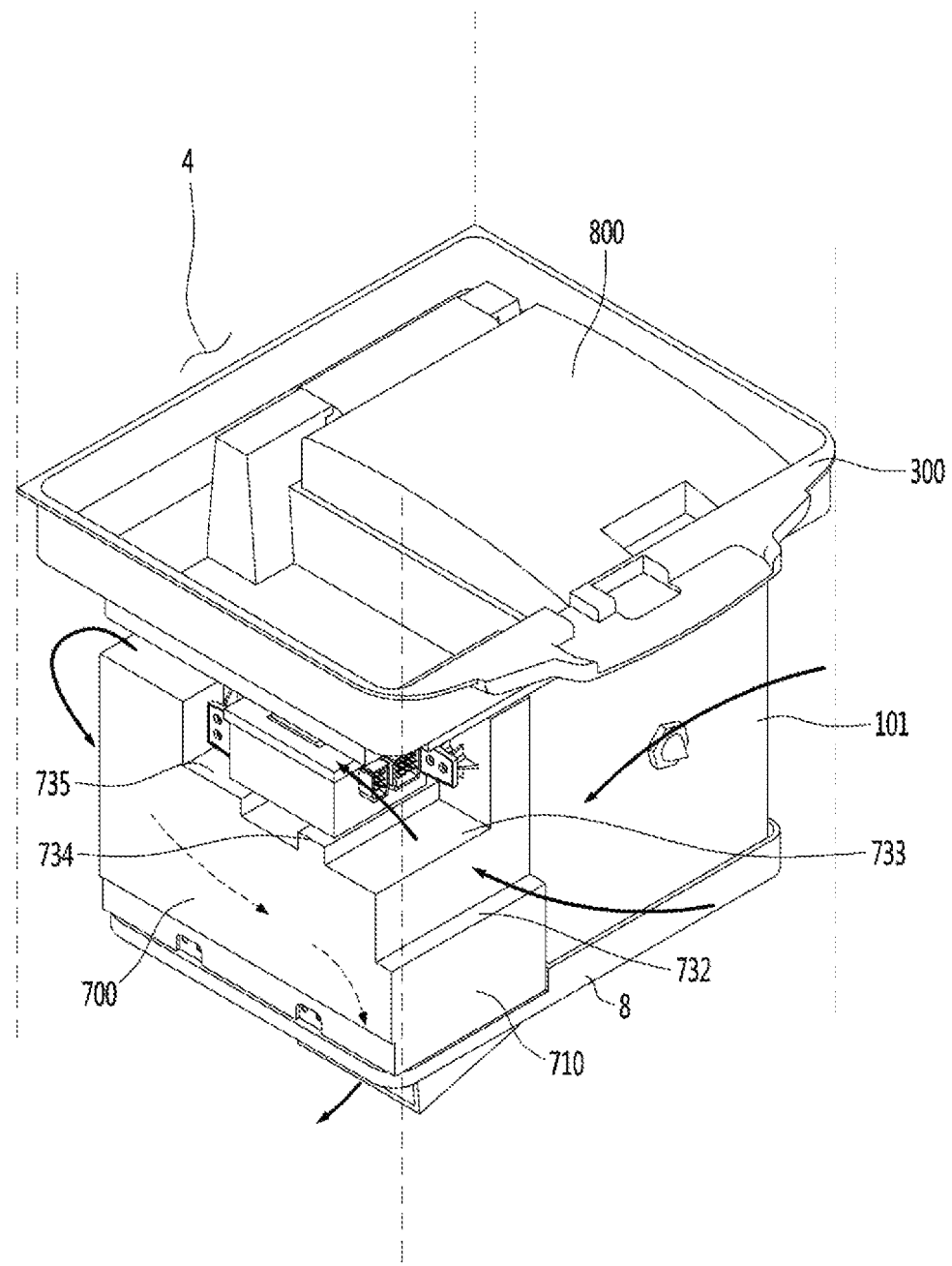
FIG. 6 is a view for explaining an air flow outside of a machine room of the vehicle refrigerator.

FIG. 6 is a view for explaining an air flow outside of a machine room of the vehicle refrigerator. Referring to FIG. 6, air introduced into the suction port 5 moves to a left (first) side of the vehicle refrigerator through a space between the vacuum adiabatic body 101 defining a front wall of the cavity 100 and a front surface of the console space 4. As a heating source is not provided at a right (second) side of the vehicle refrigerator, the suction air may be maintained at its original temperature.

The air moving to the left side of the vehicle refrigerator may be changed in direction to a rear side to move along a top surface of the machine room cover 700 outside of the machine room 200. To smoothly guide the air flow, the machine room cover 700 may have a height that gradually increases backward from the front surface 710. Also, to provide a region in which the controller 900 is disposed, and prevent the parts within the machine room 200 from interfering in position with each other, a stepped part (step) may be disposed on a top surface of the machine room cover 700.

A first stepped part (first step) 732, a second stepped part (second step) 733, and a third stepped part (third step) 735 may be successively provided backward from the front surface. A controller placing part 734 having a same height as the third stepped part 735 is disposed on the second stepped part 733. Due to this structure, the controller 900 may be disposed in parallel to the third stepped part 735 and the controller placing part 734.

The air moving along the top surface of the machine room cover 700 may cool the controller 900. When the controller 900 is cooled, the air may be slightly heated.

The air moving up to the rear side of the machine room cover 700 flows downward. An opened large cover suction port is defined in the rear surface of the machine room 200. For this, a predetermined space may be provided between the rear surface of the machine room cover 700 and the rear surface of the console space 4. Thereafter, the air cooling the inside of the machine room cover 700 is discharged to the outside through a bottom of the machine room 200.

As described above, the evaporation module 400 is disposed at a rear side of the cavity 100, and the refrigerant conduit 600 supplying the refrigerant into the evaporation module 400 passes over the cavity 100. In addition, a hinge of the door 800 and the evaporation module 400 are placed on the rear side of the cavity 100 so that a rear portion of the cavity 100 is vulnerable to thermal insulation.

To solve this limitation, a hinge adiabatic member 470 is provided. The hinge adiabatic member 470 performs an adiabatic action on an upper portion of the evaporation module 400, between the evaporation module 400 and a rear wall of the cavity 100, and a contact part between a regeneration adiabatic member 651 inserted into the cavity and an inner space of the cavity. As described above, the console cover 300 is further provided above the hinge adiabatic member 470 to lead to complete heat insulation.

Figure 7:
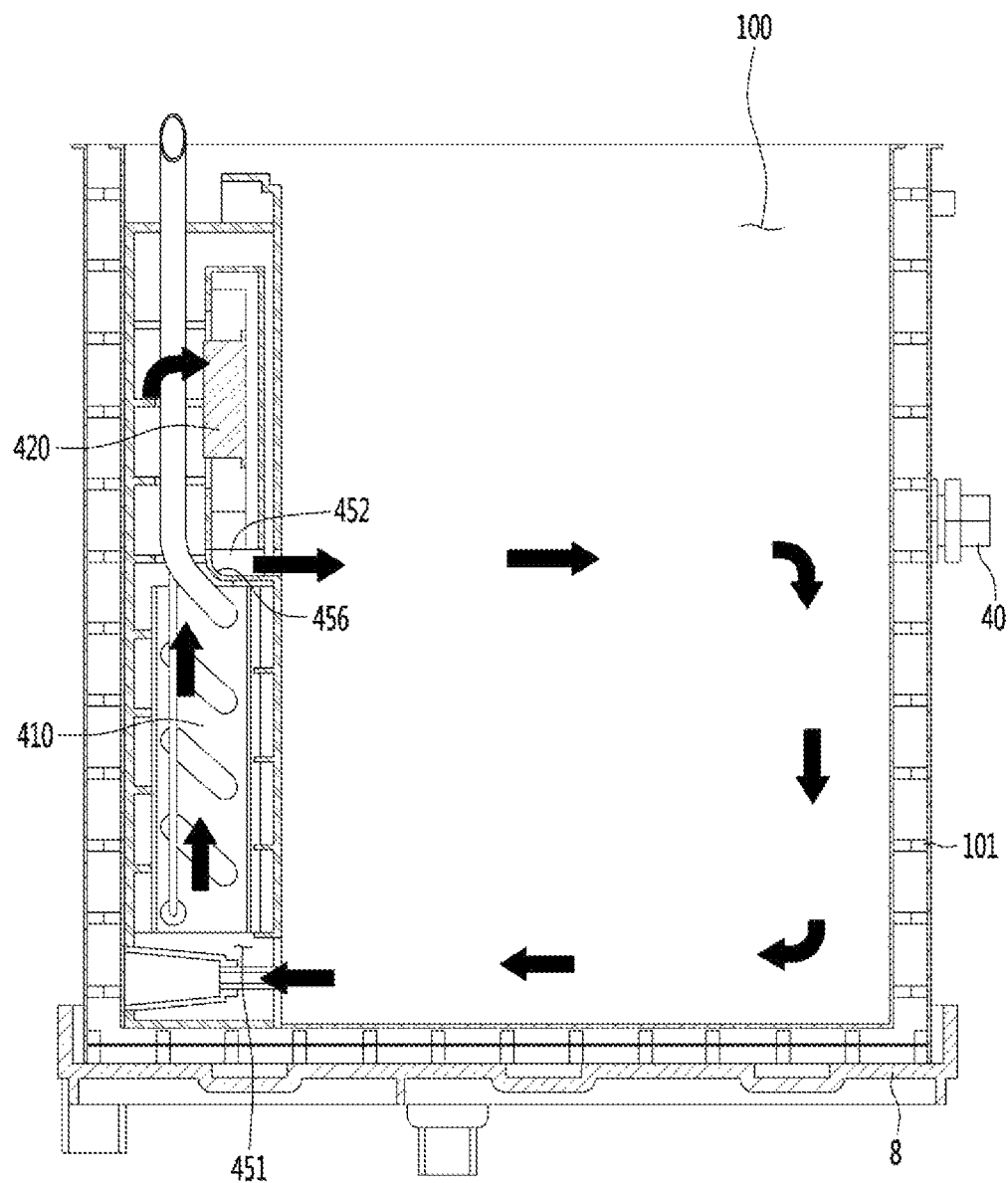
FIG. 7 is a view for explaining a cold air flow in addition to a cross-sectional view of an evaporation module.

FIG. 7 is a view for explaining a cold air flow in addition to a cross-sectional view of an evaporation module. Referring to FIG. 7, the air flow inside the evaporation module 400 may be illustrated by the arrows.

In detail, a flow of cold air will be described. The air introduced through the cold air inlet 451 on a lower side of a front cover is cooled while passing through the evaporator 410. The cooled air flows to a rear of the evaporation fan 420, is introduced through the fan inlet 422 on a rear surface of the evaporation fan 420, and is discharged downward toward the fan outlet 421 by centrifugal force. A sirocco fan may be used as the evaporation fan, and a shape of the fan housing and positioning of the fan may be adjusted to set a direction of the discharge port downward.

The air discharged from the fan outlet 421 is changed in direction to a front side through the cold air discharge port 452 and then is discharged to the inside of the cavity 100. A cold air discharge guide 456 having a shape that is smoothly bent so that the air discharged downward is smoothly bent forward and discharged may be provided in the cold air discharge port 452.

The inside of the cavity may be uniformly cooled. For example, if containers on one side and the other are cooled to different temperatures, a large number of people may not enjoy cold drinks together. From this point of view, it is important to note where the cold air discharge port 452 is formed on the front cover 450 and which direction the cold air is discharged.

Figure 8:
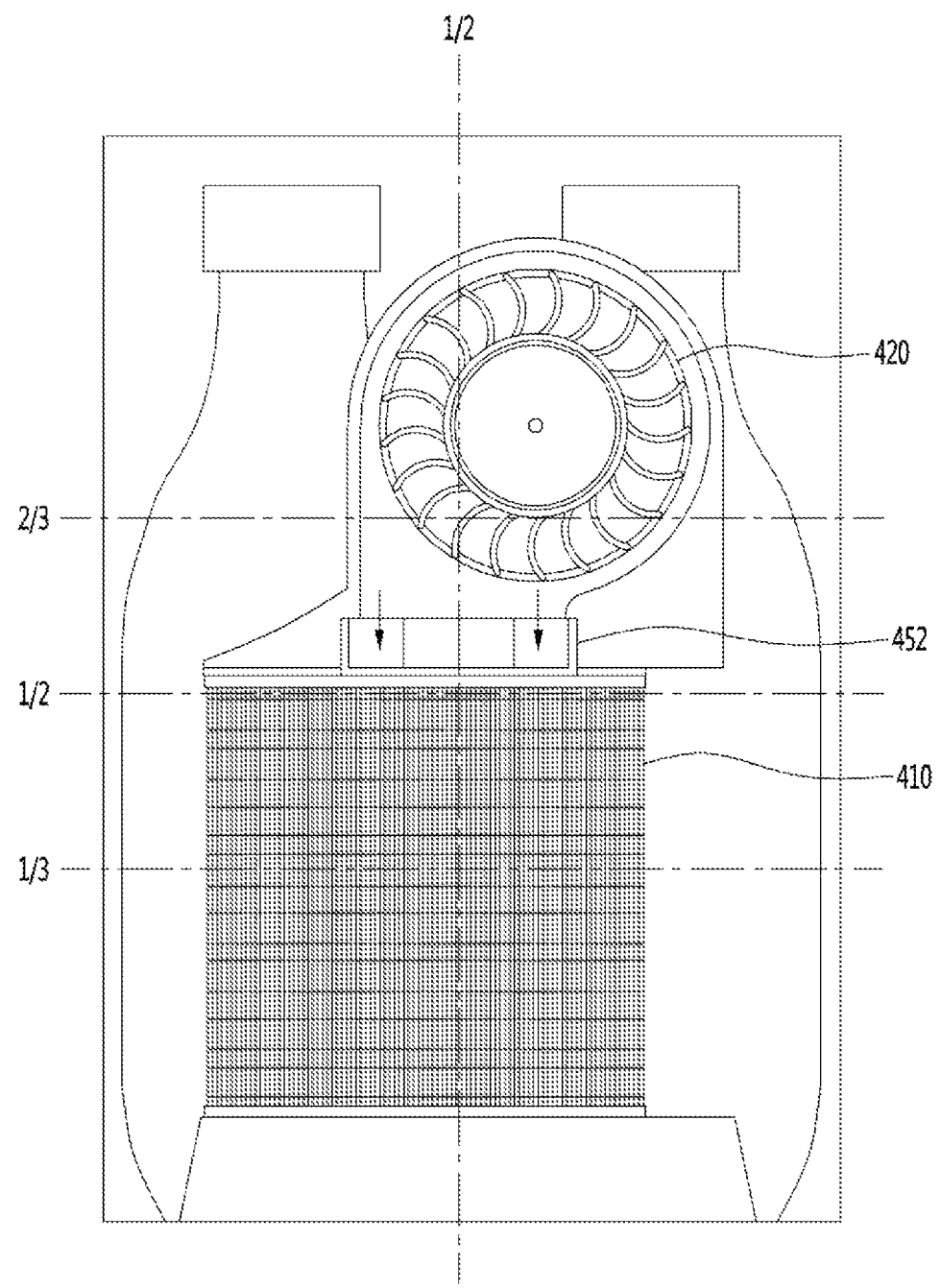
FIG. 8 is a schematic front view illustrating an inside of a cavity so as to explain a position of a cold air discharge port.

FIG. 8 is a schematic front view illustrating the inside of the cavity so as to explain a position of the cold air discharge port. Referring to FIG. 8, the cold air discharge port 452 is disposed to extend in the left and right (lateral) direction from a substantially middle height inside of the cavity.

That is, when the inside of the cavity is divided into three parts, the cold air discharge port 452 is disposed at the third part of the middle. As a result, the air discharged from the middle portion spreads through inner obstacles and then flows downward into the evaporation module 400. Also, the cold air discharge port 452 may be provided to extend horizontally, and thus, widely spread in the left and right direction so that the air is uniformly spread into the cavity 100. The cold air discharge port 452 may be disposed from the bottom of the cavity 100 at one-three point from one point.

This is because the cold air discharged from the cold air discharge port 452 collides with a storage container disposed inside of the cavity. As an upper portion of the storage container 498 is smaller than the body, the cold air may flow to the front of the cavity 100. On the contrary, as the body of the storage container 498 has a small gap, and thus, high flow resistance, it is difficult for the cold air to flow to the front of the cavity 100.

That is, as the cold air discharge port 452 is disposed between one-two point and one-three point from the bottom of the cavity 100, a flow of the cold air flowing to the front of the cavity 100 over a neck portion of the storage container and a flow of the cold air that is stopped at the rear side of the cavity 100 by colliding with the neck portion of the storage container may be joined together. Thus, an effect that the front and rear sides inside of the cavity 100 are cooled together, and thus, all products placed in the cavity 100 may be uniformly cooled.

If other products do not interfere with each other, the cold air discharge port 452 may be disposed at one-two point in the left and right direction. Thus, the cold flowing over the storage container 498, i.e., the cold air flowing over the spacing part between the storage containers 498 and the cold air does not flow over the spacing part may be distinguished from each other. It is conceivable that two rows, i.e., two beverage containers are accommodated in the cavity. This is a desirable form considering a size of the beverage container and considering the number of beverage containers that are provided in a narrow console space.

Figure 9:
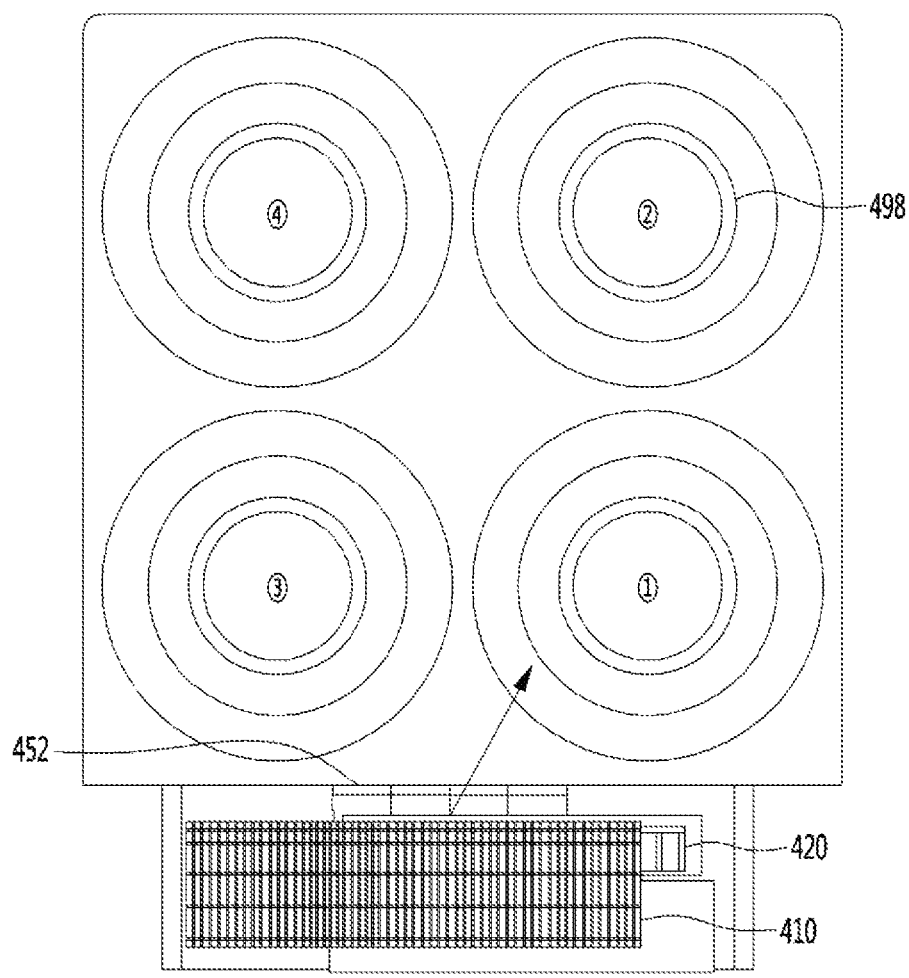
FIG. 9 is a view illustrating a discharge direction of cold air through the cold air discharge port.

FIG. 9 is a view illustrating a discharge direction of cold air through the cold air discharge port. Referring to FIG. 9, cold air discharge port 452 is provided substantially at a center when viewed from upper, lower, left, and right sides of the rear surface of the cavity, and cold air is discharged to the right side with reference to the drawing. There are four storage containers 498 placed inside of the cavity 100 and assigned different numbers depending on their positions.

Referring to the drawings, an operation of the embodiment based on temperature change of the storage container 498 will be described hereinafter.

Figure 10:
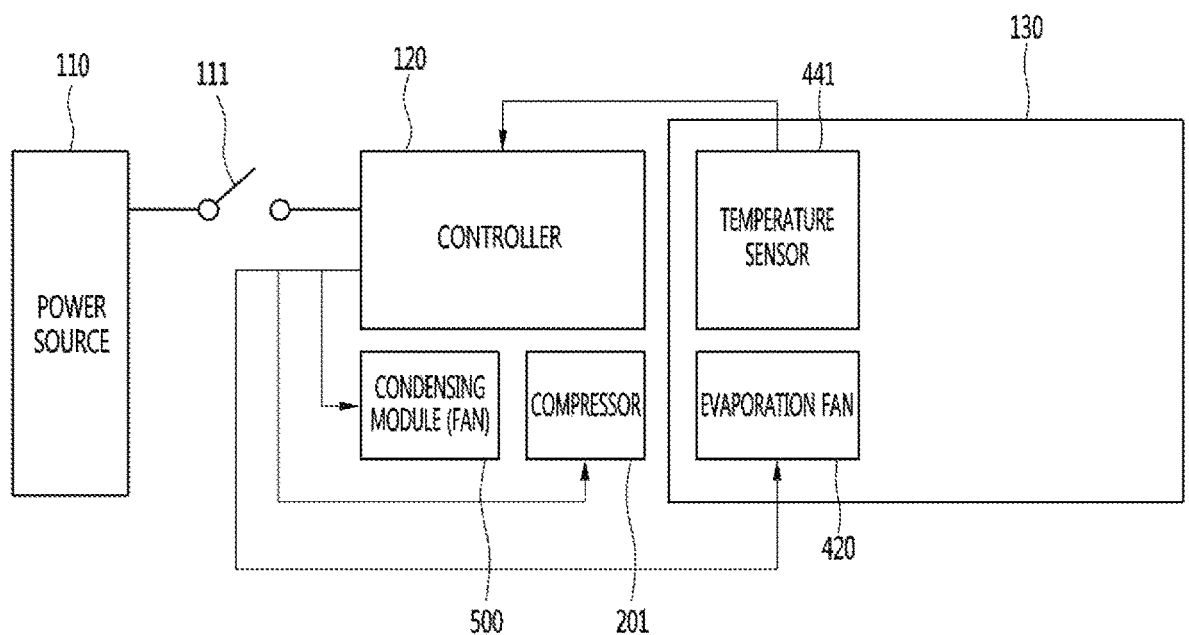
FIG. 10 is a view for explaining a configuration of a control device of the vehicle refrigerator.

FIG. 10 is a view for explaining a control device of the vehicle refrigerator. Referring to FIG. 10, in the vehicle refrigerator, an on-off switch is connected to a power source 110. The on-off switch 111 is a switch for operating when the user wants to use the refrigerator. The on-off switch 111 may be provided on a dashboard of the vehicle, for example, which is accessible to the user's hand.

The vehicle refrigerator may be operated under the control of a controller 120. The vehicle refrigerator includes a temperature sensor 441 provided in an interior 130 of the refrigerator to measure a temperature of the interior 130 of the refrigerator. The evaporation fan 420 for cooling the interior 130 of the refrigerator by evaporation of the refrigerant is provided in the interior 130 of the refrigerator. The compressor 201 that compresses the refrigerant and a condensation module 500 that condenses the refrigerant are provided at an exterior of the refrigerator, which is separated from the interior 130 of the refrigerator. The condensation module 500 may include a fan.

The compressor 201, the condensation module 500, the evaporation fan 420, and the temperature sensor 441 may be operated by communicating with the controller 120. The controller 120 and each of the components of the vehicle refrigerator may be automatically performed by turning the on-off switch 111 on. The on-off switch 111 may be operated only when a main power switch of the vehicle, that is, the power supply switch of the vehicle is turned on. Thus, discharge of the vehicle may be prevented.

Figure 11:
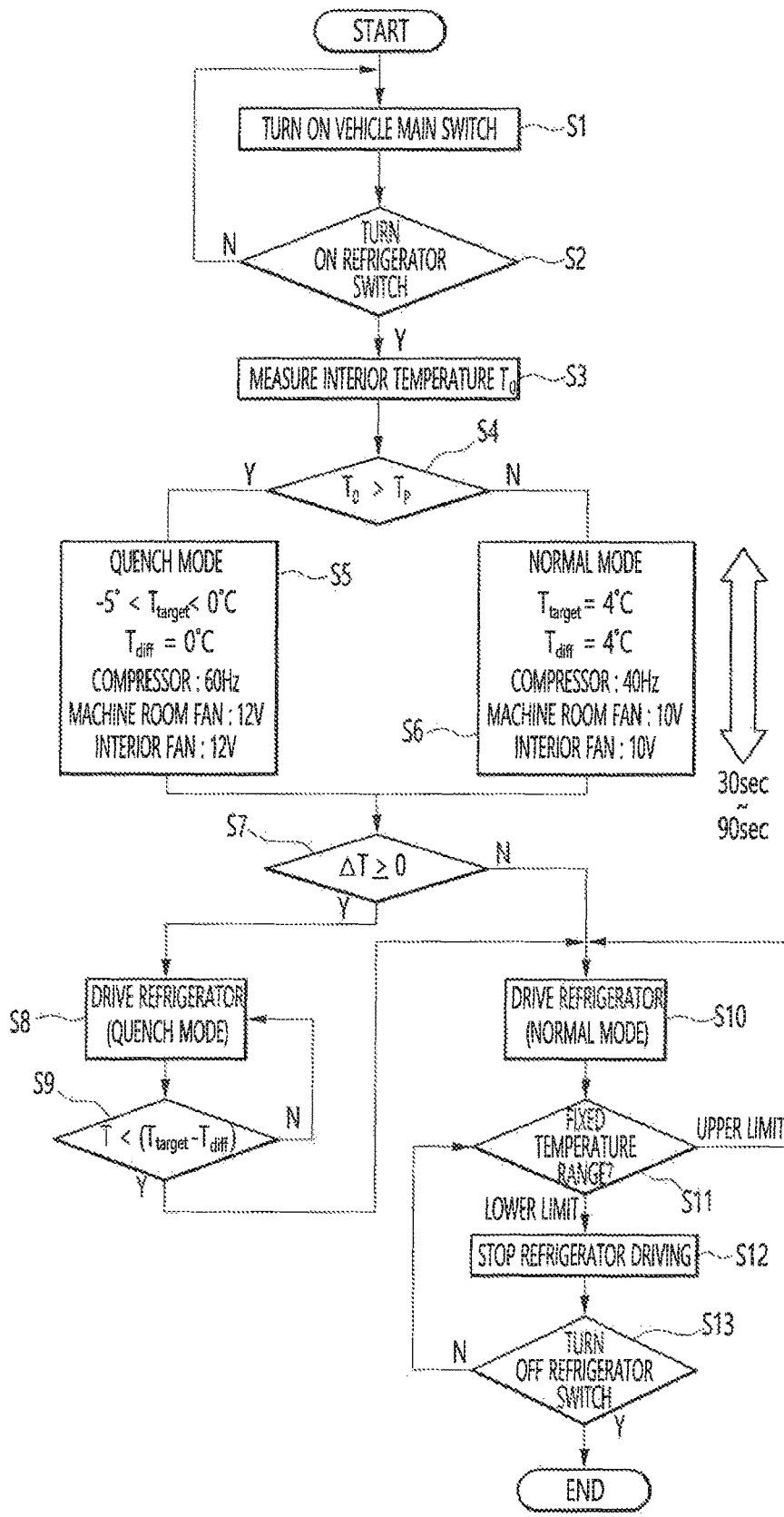
FIG. 11 is a flowchart for explaining a method for controlling a vehicle refrigerator.

FIG. 11 is a flowchart for explaining a method for controlling a vehicle refrigerator. Referring to FIG. 11, a main switch of a vehicle is turned on (S1). When there is a need of a user to cool beverages, the user turns on the refrigerator (S2). If the main switch of the vehicle is not turned on, the switch of the refrigerator may be prevented from being turned on. Typically, a user may drive the vehicle refrigerator by inserting beverages and food, for example (hereinafter, referred to as a "storage article"), into the vehicle refrigerator.

When the on-off switch 111 of the refrigerator is turned on, the controller 120 reads a temperature $T_O$ of the interior 130 of the refrigerator in the current state from the temperature sensor 441 (S3). It is determined whether the interior 130 of the refrigerator is higher than a reference temperature $T_P$ (S4). If the interior 130 of the refrigerator is higher than the reference temperature, an operation of a quench mode is prepared (S5). If the interior 130 of the refrigerator is lower than the reference temperature, an operation of a normal mode is prepared (S6). However, operation of the vehicle refrigerator is not started.

The reference temperature may be set to 15° C. The selection of the reference temperature will be described with reference to the graph of solubility of carbon dioxide in FIG. 14.

Figure 14:
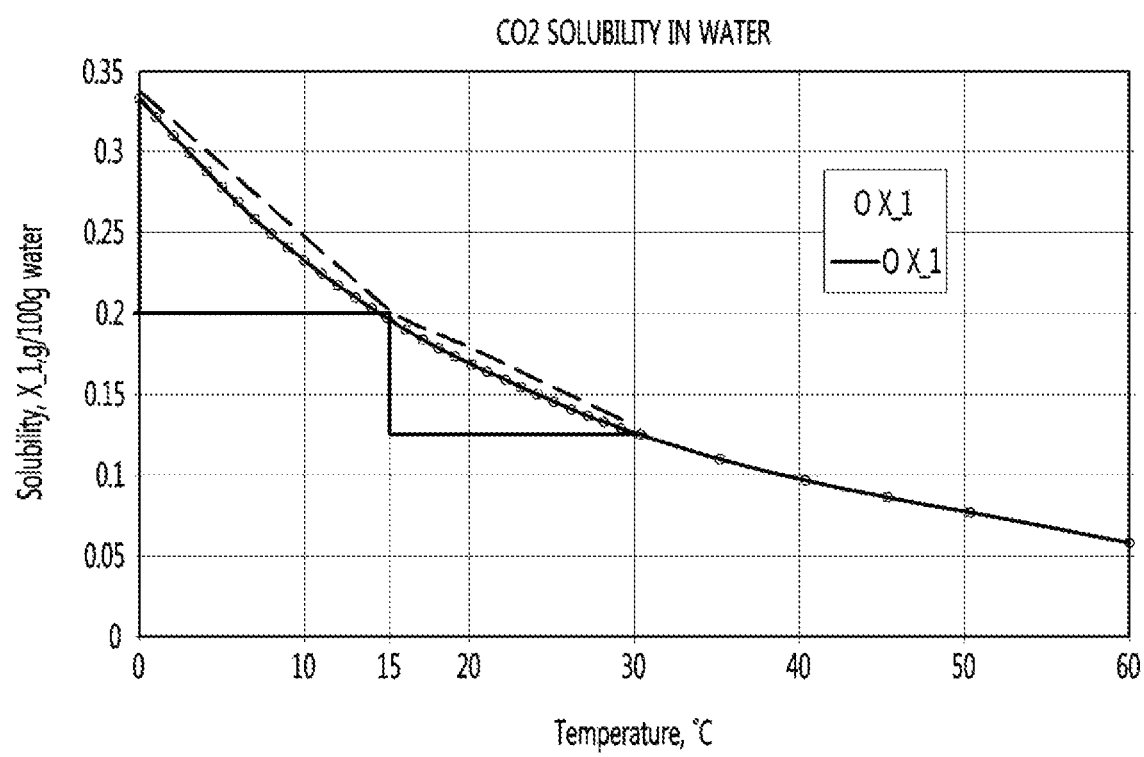
FIG. 14 is a graph of solubility of carbon dioxide.

Referring to FIG. 14, the solubility of carbon dioxide varies according to a temperature, and under 1 atmospheres, the temperature may increase twice while changing from 30° C. to 15° C. An amount of carbon dioxide dissolved in soft drinks is the main factor that gives the refreshing feeling of carbonated beverages. Thus, the inventor selects a predetermined reference temperature of 15° C., which is twice the solubility of carbon dioxide, as compared to when the general person feels hot. The reference temperature may be used as a reference for classifying the quench mode and the normal mode.

In the quench mode, a target temperature $T_{target}$ may be set to any temperature in the middle of −5° C. to 0° C., and a control temperature deviation $T_{diff}$ may be set to 0° C. In the target temperature and the control temperature deviation, the temperature of the interior 130 of the refrigerator may be controlled at a temperature between −5° C. and 0° C. In other words, the refrigeration system is turned off when the temperature reaches −5° C., and the refrigeration system is turned on when the temperature reaches 0° C.

In the quench mode, the temperature of the interior 130 of the refrigerator may be cooled quickly. In the quench mode, the operation frequency of the compressor 201 is 60 Hz, and the fan of the condensation module 500 provided in the machine room 200, and the evaporation fan 420 may be operated at 12V. A minimum temperature of the target temperature $T_{target}$ in the quench mode is set to −5° C. with reference to the temperature change curve of the members placed in the interior 130 of the refrigerator in the quench mode shown in FIG. 13.

Figure 13:
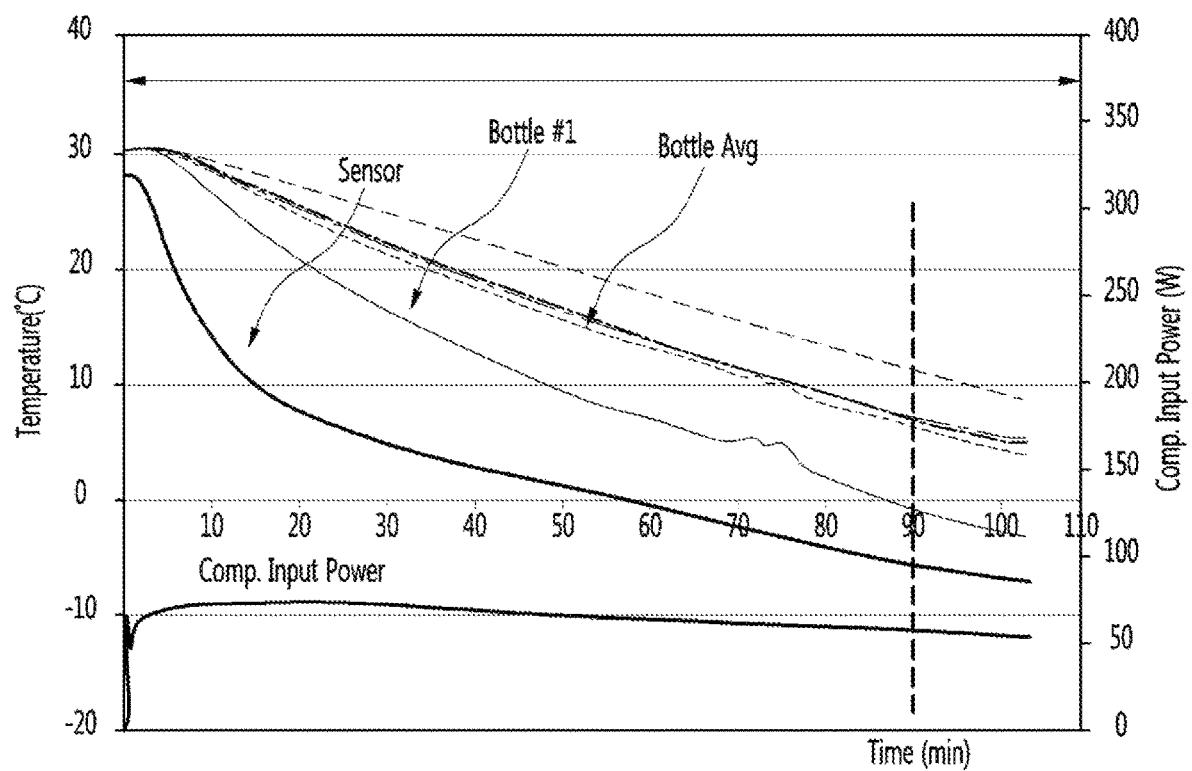
FIG. 13 is a temperature change curve of members disposed in a refrigerator in a quench mode.

Referring to FIG. 13, when the quench mode is started, the temperature of the sensor quickly decreases initially, and the temperature of the storage slowly drops due to its internal capacity. More specifically, as illustrated in FIGS. 8 and 9, the cold air blown into the interior of the refrigerator is cooled most quickly because a large amount of cold air is firstly close to a storage article. A storage article is cooled most late because the cold air is close most late and has passed through other storage articles. A large amount of cold air passing through the storage article 1 is close to the storage article, and cold air discharged from the cold air discharge port of the evaporation module in the storage article is immediately close to the storage article.

In FIG. 13, the target temperature may be set to −5° C. with reference to the temperature of the temperature sensor 441 at a point (a dotted line) at which the storage article is 0° C. This makes it possible to prevent the storage article from being frozen.

Table 1 is a table for measuring the temperature of each component at a point A in FIG. 5.

TABLE 1

| Items | Value |
| --- | --- |
| Time | 88 minutes |
| Temperature sensor | −5.1° C. |
| Storage article ① | 0 |
| Storage article ② | 7.6 |
| Storage article ③ | 7.7 |
| Storage article ④ | 11.8 |
| Storage article average | 6.8 |

Description will be made with reference to FIG. 11 again. The normal mode will be described.

In the normal mode, the target temperature $T_{target}$ may be set to 4° C. and the control temperature deviation $T_{diff}$ may be set to 4° C. In the target temperature and the control temperature deviation, the temperature of the interior 130 of the refrigerator may be controlled at a temperature between 0° C. and 8° C. In other words, the refrigeration system is turned off when the temperature reaches 0° C., and the refrigeration system is turned on when the temperature reaches 8° C.

The reason why the target temperature of the normal mode is set to 4° C. is to maintain a uniform temperature of the liquid in the storage using convection of the liquid in the storage. Specifically, a lowest density of water is at 4° C. Also, the cold air is guided to a point higher than the middle of the storage article (see FIG. 8), and the liquid may be circulated inside the storage article by positively utilizing the phenomenon that the lowered liquid sinks downward. Thus, in order to perform the action of the high density liquid sinking and the action of the liquid rising on the lower side to be performed on average in the inside of the storage article, the target temperature is set to 4° C., and the normal mode is set in the range of 0° C. to 8° C.

In the normal mode, the interior 130 of the refrigerator may be cooled more slowly than in the quench mode. This is because the main purpose is to keep the stored product at a low temperature. In the normal mode, the operation frequency of the compressor 201 is 40 Hz, and the fan of the condensation module 500 provided in the machine room 200, and the evaporation fan 420 may be operated at 10V.

The normal mode may reduce noise compared to the quench mode. In other words, as the compressor located on the side of the driver's adjacent side is operated at a low frequency, influence of vibration and noise of the compressor felt by the user may be minimized.

On the other hand, there are many cases where the vehicle is placed outdoors rather than indoors. If a parking status of the vehicle continues, the vehicle refrigerator is in thermal equilibrium with the vehicle. Like the vehicle, the vehicle refrigerator will become hot in summer, and the vehicle refrigerator will become cold in winter. As time elapses after operation of the vehicle, the internal environment of the vehicle and the refrigerator for the vehicle will progressively be in thermal equilibrium.

The user may drive the vehicle refrigerator by inserting beverages and food, for example (hereinafter, abbreviated as 'storage article'), into the vehicle refrigerator. The storage article accommodated in the interior 130 of the refrigerator may act in a direction of increasing heat load and a direction of decreasing heat load with respect to the current environment of the interior 130 of the refrigerator. In other words, the storage environment, as well as the indoor environment of the vehicle, may act as a factor for changing the temperature of the interior 130 of the refrigerator. For example, if the temperature of the storage article is lower than the temperature of the interior 130 of the refrigerator, the temperature of the storage article is lowered. If the temperature of the storage article is higher than the temperature of the interior 130 of the refrigerator, it may act in a direction to increase the temperature of the interior 130 of the refrigerator.

It is a major object of the embodiment to allow a user to quickly and conveniently take the storage article in response to a thermal state of the storage article. In order to achieve this object, the temperature is measured in the measuring step (S3) of the internal temperature, and then the temperature is measured again after waiting for a predetermined time. The waiting time may be set to 30 seconds to 90 seconds. The waiting time may be understood as a time for reading the thermal state of the storage article. For example, if the temperature of the storage article is higher than the temperature measured in the step (S3) of measuring the internal temperature, the measured temperature after the waiting time increases. On the other hand, if the temperature of the storage article is lower than the temperature measured in the step (S3) of measuring the internal temperature, the measured temperature after the waiting time decreases.

The operation mode is determined in the quench mode or the normal mode by determining the temperature change ΔT at the beginning and the end of the waiting time (S7). In order to grasp the temperature change ΔT in the interior of the refrigerator, the time measured at the beginning may be referred to as the first time and the time at which the measurement is performed later may be referred to as the second time. If it is determined in the operation mode determination step (S7) that the temperature change ΔT in the interior of the refrigerator is positive, and the temperature in the interior of the refrigerator is high. In the operation mode determination step (S7), if the temperature change ΔT in the interior of the refrigerator is negative and the temperature in the interior of the refrigerator is lowered, the normal mode is assumed to be the cold storage article.

Like the storage article, room temperature of the vehicle may have the same effect. For example, if the vehicle's room temperature is high, quenching is appropriate, and vice versa. Through this operation, the temperature of the vehicle refrigerator may be quickly and optimally controlled.

The execution of the quench mode (S8) is an operation in which the temperature in the interior of the refrigerator is drastically lowered, resulting in high power consumption and large vibration noise. Therefore, there is a limitation that energy of the vehicle is wasted and inconvenience is caused to a sensitive driver. In view of such a limitation, it is advantageous to stop operation in the quench mode after reaching the target temperature.

For this, it is determined whether the temperature in the interior of the refrigerator detected by the temperature sensor has reached the target temperature $T_{target}$ of the quench mode (S9), and the mode is switched from the quench mode to the normal mode. As described above, the target temperature of the quench mode may be set to a temperature range of −5° C. to 0° C. The control temperature deviation $T_{diff}$ may be set to 0° C. Therefore, in the quench mode operation, after reaching the preset target temperature, the operation is performed by switching to the normal mode. The execution of the normal mode (S10) may be performed after the quench mode is terminated or when a cold storage article is received.

In the normal mode (S10), the temperature in the interior of the refrigerator is slowly lowered and the temperature in the interior 130 of the refrigerator is maintained in a constant temperature range. Therefore, when performing the normal mode, power consumption is low, and vibration and noise are small.

The execution of the normal mode (S10) is performed at the target temperature $T_{target}$ and the control temperature deviation $T_{diff}$ as described above. Specifically, it is determined whether or not it deviates from a predetermined temperature range (from 0° C. to 8° C. according to the above figures) (S11). When the upper limit is shifted upward, driving of the vehicle refrigerator is continued (S10). In the case of deviating downward, driving of the vehicle refrigerator is stopped (S12). For reference, in the determining step (S11) of the temperature range, in the section in which the determination result is not changed, operation goes on in the direction of the previous determination result.

For example, if the result of the quench mode (S9) is determined to be −5° C., and the mode is shifted to the normal mode, the normal mode is entered, and the refrigerator is operated (S10). However, as the temperature is out of the predetermined temperature range of the normal mode (i.e., a range of from 0° C. to 8° C.) (S11), the refrigerator stops driving the refrigerator (S12). Thereafter, it is determined whether the switch of the refrigerator (that is, the user's instruction) is turned off (S13), and operation of the refrigerator is stopped continuously until the upper limit of the predetermined temperature range is exceeded.

Thereafter, when the measured temperature of the temperature sensor is out of the upper limit (that is, for example, 8° C. or more), the process proceeds to the drive mode of the refrigerator (S10), and then the normal mode is operated. Thus, the temperature starts to drop. That is, operation when the upper limit is exceeded is continued for a certain time.

Subsequently, in results of the temperature measured to determine the determined temperature range (S11), when it is determined that the measured temperature of the temperature sensor is out of the lower limit (that is, for example, 0° C. or less), the step of stopping operation of the refrigerator again).

As a result of the above, in the normal mode, the temperature in the interior of the refrigerator may be maintained within a constant temperature range. The user may enjoy a cold drink.

In the above embodiment, even if the initial temperature $T_O$ in the interior of the refrigerator is higher than the reference temperature $T_P$, it is determined to be one of the quench mode or the normal mode based on only the result (S7) of determining the temperature change at the start and end of the waiting time. For example, even if the reference temperature is higher than the reference temperature of 15° C. at the start of the waiting time, if the temperature decreases at the end of the waiting time period, that is, if the temperature change ΔT in the interior of the refrigerator is negative, it operates in the normal mode.

This is because, if the temperature change ΔT in the interior of the refrigerator is negative, the temperature of the storage article is low, so that the user operates the article in a satisfactory manner even if the apparatus is operated in the normal mode. In this case, as the vehicle refrigerator is operated in a low noise state, there is an effect that low noise may be realized. Of course, power consumption may be reduced, so that energy utilization efficiency may be increased.

However, in some cases, a user who wants to store the storage article at a very low temperature may be desperate. In this case, if the temperature in the interior of the refrigerator is higher than the reference temperature at the start of the standby time, even if the temperature decreases at the end of the standby time, that is, even if the temperature change ΔT in the interior of the refrigerator is negative to operate in the quench mode. In this case, it may be the case that the vehicle is kept in a non-operating state for a long time, or the vehicle is operated after stopping, and the temperature in the interior of the refrigerator is high.

Figure 12:
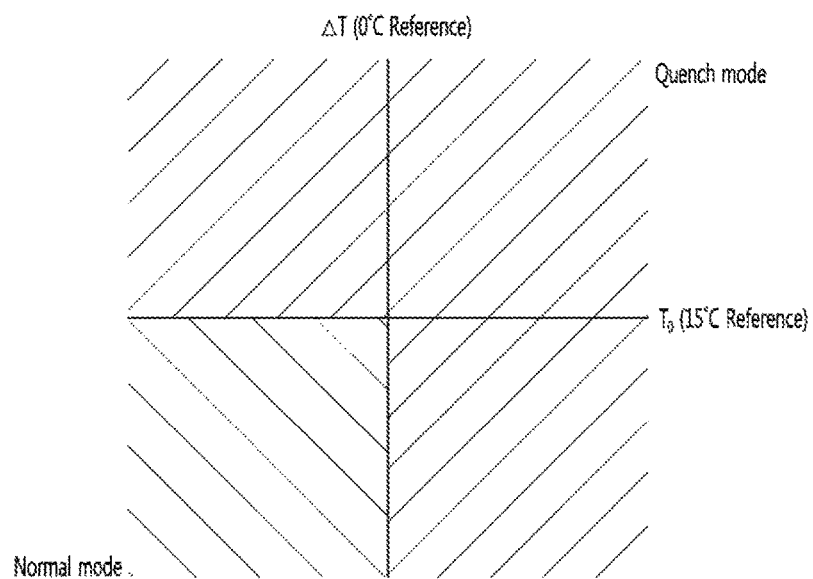
FIG. 12 is a graph for explaining an operation mode of a vehicle refrigerator according to another embodiment.

FIG. 12 is a graph for explaining an operation mode of a vehicle refrigerator according to another embodiment. Referring to FIG. 12, a horizontal axis represents the initial temperature $T_O$ in the interior of the refrigerator, and a center is the reference temperature $T_P$, which is 15° C. A vertical axis is the temperature change ΔT in the interior of the refrigerator, and the center is 0° C.

According to another embodiment, it may be seen that the fourth quadrant in FIG. 12 is operated in the quench mode.

This is different from that in the first embodiment. In the first embodiment, even if the initial temperature $T_O$ in the interior of the refrigerator is higher than the reference temperature, it is different from driving in the normal mode if the temperature change ΔT in the interior of the refrigerator is negative.

In another embodiment, the initial temperature $T_O$ in the interior of the refrigerator may be set to a final temperature in the interior of the refrigerator, that is, to a temperature at which the operation of the refrigeration cycle starts after the waiting time has elapsed. In this case, the operation mode may be determined based on the more accurate temperature of the current time point.

The structure and action of the vacuum adiabatic body 101 will be described hereinafter.

Figure 15A:
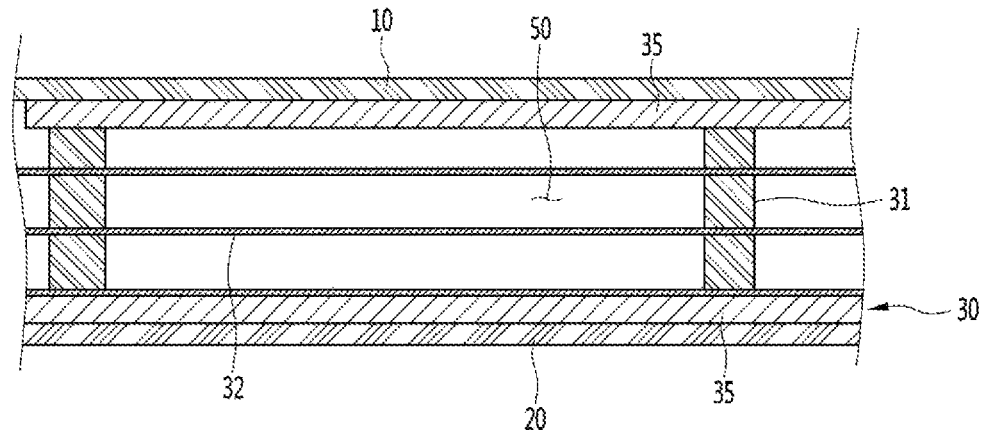
FIGS. 15A-15C are views illustrating an internal configuration of a vacuum adiabatic body according to various embodiments.
Figure 15B:
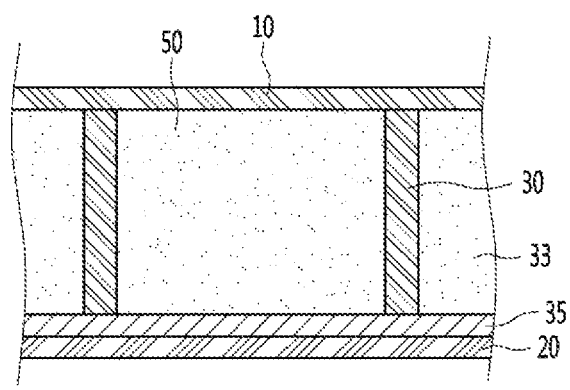
Figure 15C:
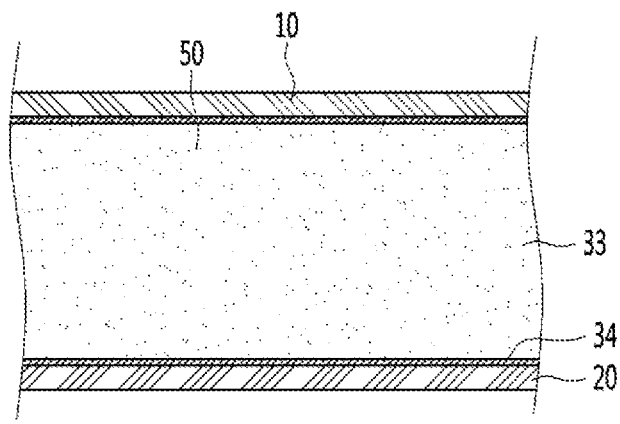

FIG. 15A-15C are views illustrating an internal configuration of a vacuum adiabatic body according to various embodiments.

First, referring to FIG. 15A, a vacuum space part (space) 50 is provided in a third space having a different pressure from first and second spaces, a vacuum state, thereby reducing adiabatic loss. The third space may be provided at a temperature between a temperature of the first space and a temperature of the second space. A component that resists heat transfer between the first space and the second space may be called a heat resistance unit. Hereinafter, all various components may be applied, or the various components may be selectively applied. In a narrow sense, a components that resists heat transfer between the plate members may be referred to as a heat resistance unit.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of heat conduction, caused by contact between the plate members 10 and 20.

A supporting unit (support) 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20.

The support plate 35 may be provided in a plate shape or may be provided in a lattice shape so that an area of the support plate contacting the first or second plate member 10 or 20 decreases, thereby reducing heat transfer. The bar and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on an extending direction of the bars 31, a total sectional area of the support plate 35 is provided to be greater than that of the bars 31, so that heat transferred through the bars 31 may be diffused through the support plate 35.

The supporting unit 30 may be made of a resin selected from polycarbonate (PC), glass fiber PC, low outgassing PC, polyphenylene sulfide (PPS), and liquid crystal polymer (LCP) to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be used as the material of the radiation resistance sheet 32. In an embodiment, an aluminum foil having an emissivity of 0.02 may be used as the radiation resistance sheet 32. Also, at least one radiation resistance sheet 32 may be provided at a certain distance so as not to contact each other. At least one radiation resistance sheet may be provided in a state in which it contacts the inner surface of the first or second plate member 10 or 20. Even when the vacuum space part 50 has a low height, one sheet of radiation resistance sheet may be inserted. In a case of the vehicle refrigerator 7, one sheet of radiation resistance sheet may be inserted so that the vacuum adiabatic body 101 has a thin thickness, and the inner capacity of the cavity 100 is secured.

Referring back FIG. 15B, a distance between the plate members is maintained by the supporting unit 30, and a porous material 33 may be filled in the vacuum space part 50. The porous material 33 may have a higher emissivity than the stainless material of the first and second plate members 10 and 20. However, as the porous material 33 is filled in the vacuum space part 50, the porous material 33 has a high efficiency for resisting the radiation heat transfer. In the present embodiment, the vacuum adiabatic body may be manufactured without the radiation resistance sheet 32.

Referring to FIG. 15C, the supporting unit 30 for maintaining the vacuum space part 50 may not be provided. A porous material 33 may be provided to be surrounded by a film 34 instead of the supporting unit 30. The porous material 33 may be provided in a state of being compressed so that the interval of the vacuum space part is maintained. The film 34 made of, for example, a polyethylene resin (PE) material may be provided in a state in which a hole is punched in the film 34.

In the present embodiment, the vacuum adiabatic body may be manufactured without the supporting unit 30. That is, the porous material 33 may perform the function of the radiation resistance sheet 32 and the function of the supporting unit 30 together.

Figure 16A:
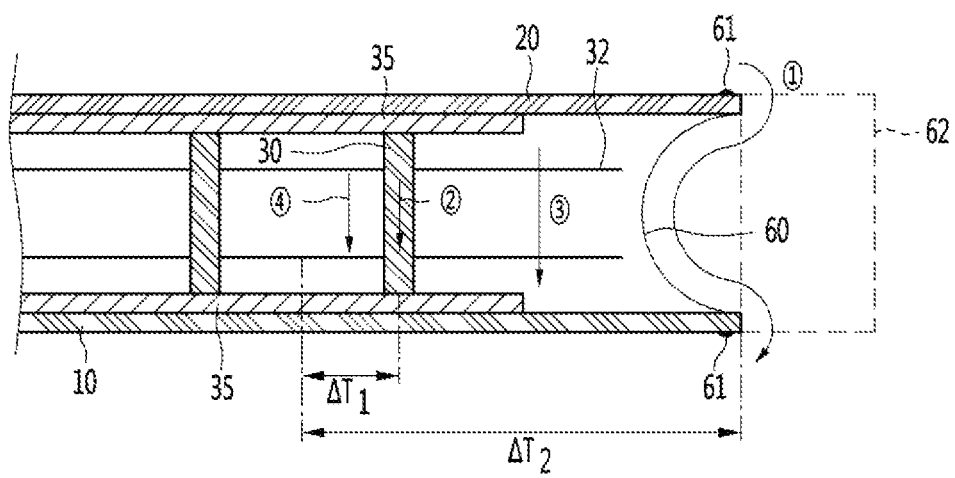
Figure 16B:
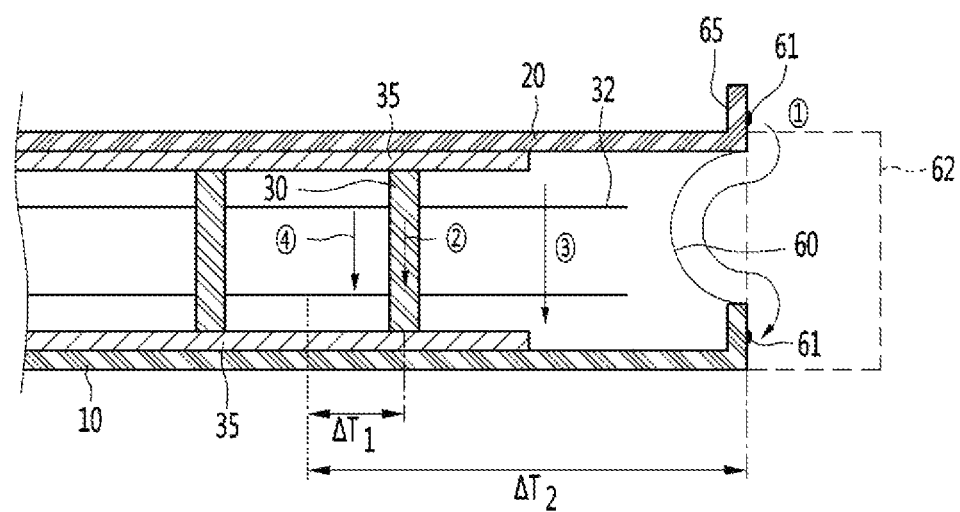

FIGS. 16A-16B are views showing embodiments of conductive resistance sheets and peripheral parts thereof. Referring to FIG. 16A, the first and second plate members 10 and 20 are to be sealed so as to vacuumize the interior of the vacuum adiabatic body. In this case, as the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts (sealing) 61 at both ends of which the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of a same material, and a stainless material may be used as the material. The sealing parts 61 are not limited to the welding parts, and may be provided through a process, such as cocking. The conductive resistance sheet 60 may be provided in a curved shape. Thus, a heat conduction distance of the conductive resistance sheet 60 is provided longer than a linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (shield) 62 may be provided at an exterior of the conductive resistance sheet 60 such that an adiabatic action occurs. That is, in a case of the refrigerator 7 for a vehicle, the second plate member 20 has a high temperature and the first plate member 10 has a low temperature. In addition, heat conduction from high temperature to low temperature occurs in the conductive resistance sheet 60, and hence, the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at an exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described with reference to FIG. 16A.

Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside of the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, a distance between the plate members may be changed, and a length of the conductive resistance sheet may be changed. The transfer heat may be changed depending on a difference in temperature between the spaces (the first and second spaces) respectively provided by the plate members. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat may be controlled to be equal to or smaller than 4% of the total heat transfer amount. A heat transfer amount by solid conduction heat defined as a sum of the surface conduction heat and the supporter conduction heat is largest. For example, the heat transfer amount by the solid conduction heat may reach 75% of the total heat transfer amount. A heat transfer amount by the radiation transfer heat is smaller than the heat transfer amount by the solid conduction heat but larger than the heat transfer amount of the gas conduction heat. For example, the heat transfer amount by the radiation transfer heat may occupy about 20% of the total heat transfer amount.

According to such a heat transfer distribution, effective heat transfer coefficients (eK: effective K) (W/mK) of the surface conduction heat, the supporter conduction heat, the gas conduction heat, and the radiation transfer heat may have an order of Math Equation 1.

$$eK_{solid\ conduction\ heat} > eK_{radiation\ transfer\ heat} > eK_{gas\ conduction\ heat} \quad \text{[Equation 1]}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k = QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat, and the radiation transfer heat may be obtained by subtracting the surface conduction heat and the supporter conduction heat from the heat transfer amount of the entire vacuum adiabatic body. A ratio the gas conduction heat, and the radiation transfer heat may be obtained by evaluating radiation transfer heat when no gas conduction heat exists by remarkably lowering a vacuum degree of the vacuum space part 50.

When a porous material is provided inside the vacuum space part 50, porous material conduction heat may be a sum of the supporter conduction heat and the radiation transfer heat. The porous material conduction heat may be changed depending on various variables including a kind, and an amount, for example, of the porous material.

In the second plate member 20 temperature difference between an average temperature of the second plate and a temperature at a point at which a heat transfer path passing through the conductive resistance sheet 60 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Referring to FIG. 16B, this configuration is the same as that of FIG. 16A except that portions at which the first plate member 10, and the second plate member 20 are coupled to the conductive resistance sheet 60. Thus, respective description has been omitted and only the characteristic changes are described.

Ends of the plate members 10 and 20 may be bent to the second space having a high temperature to form a flange part (flange) 65. A welding part (welding) 61 may be disposed on a top surface of the flange part 65 to couple the conductive resistance sheet 60 to the flange part 65. In this embodiment, the worker may perform welding while facing only anyone surface. Thus, since it is unnecessary to perform two processes, the process may be convenient.

It is more advantageous to apply the case in which welding of the inside and the outside are difficult as illustrated in FIG. 16A because a space of the vacuum space part 50 is narrow like the vehicle refrigerator 7.

Figure 17:
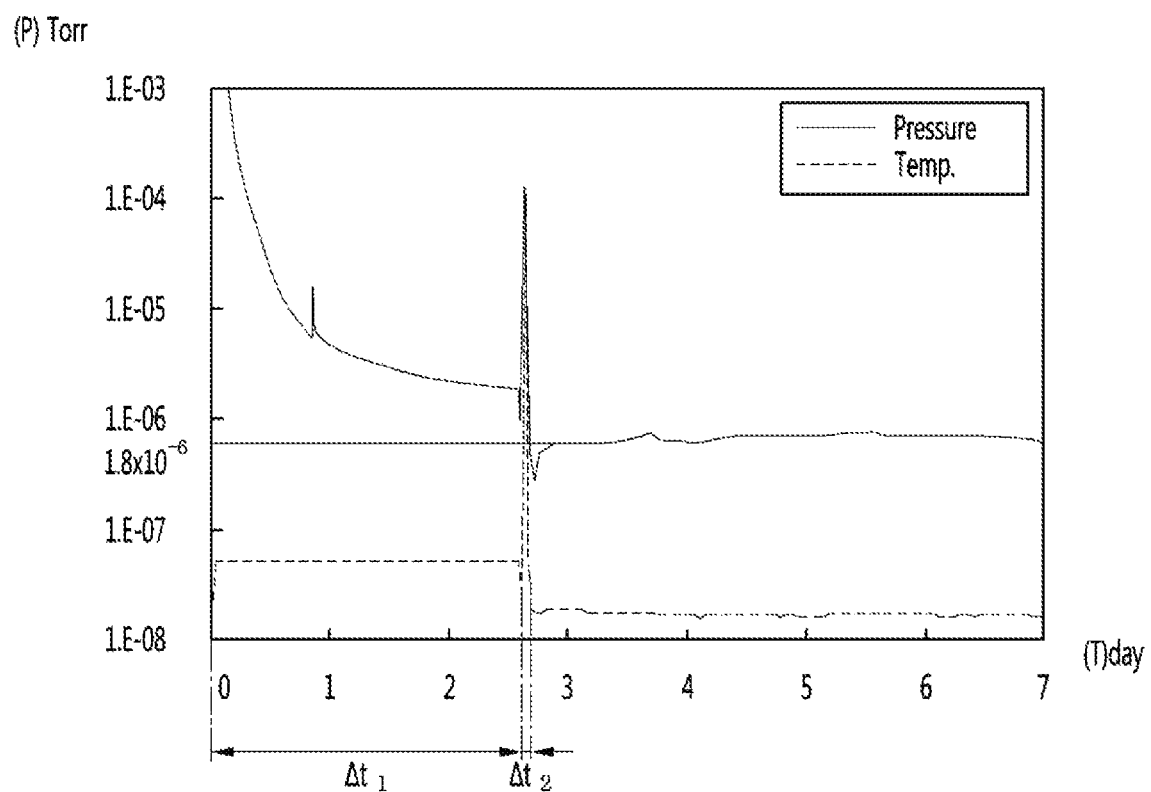
FIG. 17 is a graph illustrating results obtained by observing a time and a pressure in a process of exhausting the inside of the vacuum adiabatic body when a supporting unit is used.

FIG. 17 is a graph illustrating results obtained by observing a time and a pressure in a process of exhausting the inside of the vacuum adiabatic body when a supporting unit is used. Referring to FIG. 17, in order to create the vacuum space part 50 to be in the vacuum state, a gas in the vacuum space part 50 is exhausted by a vacuum pump while evaporating a latent gas remaining in parts of the vacuum space part 50 through baking. However, if the vacuum pressure reaches a certain level or more, there exists a point at which the level of the vacuum pressure is not increased any more (ΔT1). After that, the getter is activated by disconnecting the vacuum space part 50 from the vacuum pump and applying heat to the vacuum space part 50(ΔT2). If the getter is activated, the pressure in the vacuum space part 50 is decreased for a certain period of time, but then normalized to maintain a vacuum pressure of a certain level. The vacuum pressure that maintains the certain level after activation of the getter is approximately $1.8 \times 10^{-6}$ Torr.

In the embodiment, a point at which the vacuum pressure is not substantially decreased any more even though the gas is exhausted by operating the vacuum pump is set to a lowest limit of the vacuum pressure used in the vacuum adiabatic body, thereby setting a minimum internal pressure of the vacuum space part 50 to $1.8 \times 10^{-6}$ Torr.

Figure 18:
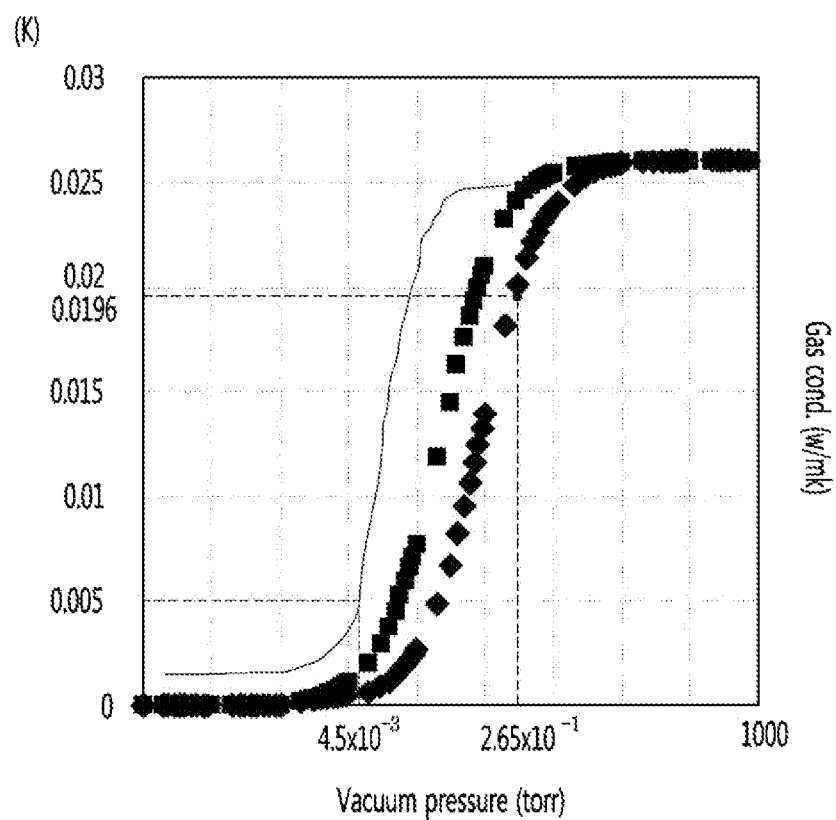
FIG. 18 is a graph obtained by comparing a vacuum pressure with gas conductivity.

FIG. 18 is a graph obtained by comparing a vacuum pressure with gas conductivity. Referring to FIG. 18, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside of the vacuum space part 50, the gap is a distance between the radiation resistance sheet 32 and the plate member adjacent thereto. When the radiation resistance sheet 32 does not exist inside of the vacuum space part 50, the gap is a distance between the first and second plate members.

It was seen that, as the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. It was seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is in the middle between the vacuum pressure when only the supporting unit is used and the vacuum pressure when only the porous material is used.

Hereinafter, another embodiment will be described.

In above-described embodiment, the refrigerator applied to the vehicle has been mainly described. However, embodiments are not limited thereto. For example, the ideas may be applied to a warming refrigerator and a cooling and warming refrigerator. Of course, embodiments are not limited to a vehicle, but may be applied to any apparatus that generates a desired temperature of a product. However, it would be advantageous for the vehicle refrigerator.

Particularly, in the case of the warming apparatus, a direction of the refrigerant may be configured to be opposite to that of the refrigerator. In the case of the cooling and warming apparatus, four sides that reverse the direction of the refrigerant may be installed on the refrigerant passage according to whether the refrigerant operates as a refrigerator or a warming apparatus.

The condensation module may be referred to as a first heat exchange module or first heat exchanger, and the evaporation module may be referred to as a second heat exchange module or second heat exchanger regardless of the change of the refrigerator and the warming apparatus. The first and second meanings denote division of the heat exchange module and may be exchanged with each other.

According to embodiments, a vehicle refrigerator that receives only power from outside and which is an independent apparatus may be efficiently realized.

The invention claimed is:

1. A method for controlling a refrigerator for a vehicle, the method comprising:
   turning on a switch of the refrigerator for the vehicle;
   measuring a temperature of an interior of the refrigerator for the vehicle a first time;
   measuring a temperature of the interior of the refrigerator for the vehicle a second time after a predetermined time has elapsed from the first time;
   determining a temperature change of the interior of the refrigerator from the first time to the second time without operation of a cooling system for the refrigerator; and
   operating the refrigerator for the vehicle in a quench mode in which the temperature in the interior of the refrigerator is lowered, unlike a normal mode, if the temperature change in the interior of the refrigerator is in a positive direction, wherein the temperature in the interior of the refrigerator in the quench mode is lowered faster than in the normal mode.

2. The method according to claim 1, wherein when the temperature measured at the first time is higher than a reference temperature the refrigerator for the vehicle is operated in the quench mode.

3. The method according to claim 1, wherein when the temperature measured at the first time is higher than a reference temperature, and the temperature change in the interior of the refrigerator is negative, the refrigerator for the vehicle is operated in the quench mode.

4. The method according to claim 1, wherein when the temperature change in the interior of the refrigerator is negative the refrigerator for the vehicle is operated in the normal mode.

5. The method according to claim 1, wherein, in the normal mode, a frequency of a compressor is lower than a frequency of the compressor in the quench mode, and a voltage supplied to fans of a condenser and an evaporator is lower than a voltage supplied to the fans in the quench mode.

6. The method according to claim 5, wherein, in the normal mode, the frequency of the compressor is 40 Hz and the voltage supplied to the fans is 10 V, and in the quench mode, the frequency of the compressor is 60 Hz and the voltage supplied to the fans is 12 V.

7. The method according to claim 5, wherein, in the quench mode, a target temperature range is −5° C. to 0° C. and a control temperature deviation is 0° C.

8. The method according to claim 5, wherein, in the normal mode, a target temperature is 4° C. and a control temperature deviation is 4° C.

9. The method according to claim 1, wherein the switch of the refrigerator for the vehicle is operated only when the vehicle is started.

10. The method according to claim 1, wherein when a predetermined target temperature is reached during the quench mode, an operation mode is shifted to the normal mode.

11. The method according to claim 10, wherein, in the normal mode, operation of the vehicle refrigerator is stopped when the temperature falls below a predetermined temperature and the operation of the vehicle refrigerator is started when the temperature rises to a predetermined temperature or more.

12. The method according to claim 1, wherein a time between the first time and the second time is within a range of 30 seconds to 90 seconds.

13. The method according to claim 1, wherein a wall of the refrigerator for the vehicle is provided as a vacuum adiabatic body, and wherein the vacuum adiabatic body comprises:
   a first plate defining at least a portion of a wall for a first space;
   a second plate defining at least a portion of a wall for a second space having a second temperature different from a first temperature of the first space;
   a seal that seals the first plate and the second plate to provide a third space having a third temperature between the first temperature and the second temperature, wherein the third space is a vacuum space;
   a support that maintains the third space;
   a heat resistor that reduces heat transfer between the first plate and the second plate; and
   a port through which air of the third space is exhausted.

14. The method according to claim 1, wherein a compressor and a condenser are provided outside of a wall of the refrigerator for the vehicle, and the wall of the refrigerator for the vehicle, the compressor, and the condenser are supported by a single refrigerator bottom frame.

15. A refrigerator for a vehicle, the refrigerator comprising:
   a cavity disposed in the vehicle to accommodate an article;
   a temperature sensor disposed in the cavity;
   a machine room disposed adjacent to the cavity;
   a compressor disposed in the machine room to compress a refrigerant;

a condenser disposed in the machine room to heat-exchange with the refrigerant;

an evaporator accommodated in the cavity to heat-exchange with the refrigerant;

a controller that operates the compressor, the condenser, and the evaporator based on a temperature measured by the temperature sensor; and an on-off switch that turns on/off power of the vehicle, which is input to the controller, wherein the controller measures a temperature at least two times for a predetermined time without operation of a cooling system for the refrigerator, when the on-off switch is turned on without operation of the compressor, and when the temperature is an ascending temperature, the refrigerator is operated in a quench mode in which an inner space of the cavity is cooled at a first speed, and when the temperature is a descending temperature, the refrigerator is operated in a normal mode in which the inner space of the cavity is cooled at a second speed, wherein the first speed is faster than the second speed.

16. The refrigerator according to claim 15, wherein the on-off switch is configured to be operated by a user.

17. The refrigerator according to claim 15, wherein the refrigerator is operated in the normal mode after the quench mode is ended.

18. The refrigerator according to claim 17, wherein the quench mode is ended when the temperature measured by the temperature sensor initially reaches a predetermined temperature.

19. A refrigerator for a vehicle, the refrigerator comprising:

a cavity disposed in the vehicle to accommodate an article;

a temperature sensor disposed in the cavity;

a machine room disposed adjacent to the cavity;

a compressor disposed in the machine room to compress a refrigerant;

a condenser disposed in the machine room to heat-exchange with the refrigerant;

an evaporator accommodated in the cavity to heat-exchange with the refrigerant;

a controller that operates the compressor, the condenser, and the evaporator based on a temperature measured by the temperature sensor; and an on-off switch configured to turn on/off power of the vehicle, which is input to the controller, wherein the controller measures a temperature at least two times for a predetermined time without operation of a cooling system for the refrigerator, when the on-off switch is turned on, and when the temperature is an ascending temperature or the temperature is a descending temperature, and an initial temperature is equal to or higher than a predetermined temperature, an internal space of the cavity is cooled at a first speed, and when the temperature is a descending temperature, and the initial temperature is lower than a predetermined temperature, the refrigerator is operated in a normal mode in which an inner space of the cavity is cooled at a second speed, wherein the first speed is faster than the second speed.

* * * * *